(12) United States Patent
Willars et al.

(10) Patent No.: US 7,003,297 B2
(45) Date of Patent: Feb. 21, 2006

(54) PARTIAL SUPPORT OF MOBILITY BETWEEN RADIO ACCESS NETWORKS

(75) Inventors: Par Willars, Stockholm (SE); Håkan Palm, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 593 days.

(21) Appl. No.: 10/068,000

(22) Filed: Feb. 8, 2002

(65) Prior Publication Data

US 2002/0123348 A1 Sep. 5, 2002

Related U.S. Application Data

(63) Continuation-in-part of application No. 09/286,471, filed on Apr. 6, 1999.

(60) Provisional application No. 60/268,065, filed on Feb. 13, 2001, provisional application No. 60/301,442, filed on Jun. 29, 2001.

(51) Int. Cl.
    *H04Q 7/20* (2006.01)

(52) U.S. Cl. ...................... 455/436; 455/432

(58) Field of Classification Search ........ 455/436–439, 455/443, 446, 444, 453, 456.1, 435.1–3, 455/432.1–3, 433; 370/331, 332
See application file for complete search history.

(56) References Cited

U.S. PATENT DOCUMENTS

| | | | |
|---|---|---|---|
| 4,670,899 A * | 6/1987 | Brody et al. | ............... 455/453 |
| 5,276,907 A | 1/1994 | Meidan | |
| 5,345,467 A | 9/1994 | Lomp et al. | |
| 5,425,029 A | 6/1995 | Hluchyj et al. | |
| 5,640,414 A | 6/1997 | Blakeney, II et al. | |
| 5,771,275 A | 6/1998 | Brunner et al. | |
| 5,845,203 A | 12/1998 | LaDue | |
| 5,862,480 A | 1/1999 | Wild et al. | |
| 5,870,427 A | 2/1999 | Tiedemann, Jr. et al. | |
| 5,873,036 A | 2/1999 | Vucetic | |
| 5,903,832 A | 5/1999 | Seppanen et al. | |
| 5,920,828 A | 7/1999 | Norris et al. | |
| 5,999,811 A | 12/1999 | Mölne | |
| 6,038,449 A * | 3/2000 | Corriveau et al. | .......... 455/439 |
| 6,081,515 A * | 6/2000 | Toivola | ..................... 370/339 |
| 6,128,490 A | 10/2000 | Shaheen et al. | |
| 6,212,390 B1 * | 4/2001 | Rune | ..................... 455/456.6 |

(Continued)

FOREIGN PATENT DOCUMENTS

EP     0 888 026 A2    12/1998

(Continued)

OTHER PUBLICATIONS

U.S. Appl. No. 60/282,486, filed Apr. 10, 2001 entitled "Commanding Handover Between Differing Radio Access Technologies".

(Continued)

*Primary Examiner*—CongVan Tran
(74) *Attorney, Agent, or Firm*—Nixon & Vanderhye, P.C.

(57) ABSTRACT

Attempted utilization (by a user equipment unit which subscribes to its subscription operator network) of a restricted cell is precluded or rejected by an auxiliary operator's network, the restricted cell being any cell of the auxiliary operator network for which a subscription operator network has a competing cell. The rejected attempted utilization can be one of (1) handover to the restricted cell, and (2) cell/URA updating by the user equipment unit via the restricted cell. Further, preclusion of attempted utilization of the restricted cell occurs when the user equipment unit attempts cell reselection.

70 Claims, 14 Drawing Sheets

U.S. PATENT DOCUMENTS

| | | | | |
|---|---|---|---|---|
| 6,230,017 | B1 * | 5/2001 | Andersson et al. | 455/456.6 |
| 6,438,375 | B1 * | 8/2002 | Muller | 455/435.3 |
| 6,529,490 | B1 * | 3/2003 | Oh et al. | 370/331 |
| 6,539,236 | B1 * | 3/2003 | Hakkinen et al. | 455/525 |
| 2002/0151304 | A1 * | 10/2002 | Hogan | 455/436 |
| 2003/0013443 | A1 * | 1/2003 | Willars et al. | 455/432 |

FOREIGN PATENT DOCUMENTS

| | | |
|---|---|---|
| GB | 2 315 193 A | 1/1998 |
| WO | 95/15665 | 6/1995 |
| WO | 98/06226 | 2/1998 |
| WO | 98/39940 A2 | 9/1998 |
| WO | 99/67902 | 12/1999 |

OTHER PUBLICATIONS

ITU-T Recommendation Q.2630.1, Series Q: Switching and Signalling, Broadband ISDN—Common Aspects of B-ISDN Application Protocols for Access Signalling and Network Signalling and Interworking, AAL Type 2 Signalling Protocol—Capability Set 1, Dec. 1999.

3GPP TS 25,304, V3.9.0 (Dec. 2001); 3$^{rd}$ Generation Partnership Project; Tech. Spec. Group Radio Access Network; UE Procedures in Idle Mode and Procedures for Cell Reselection in Connected Mode (Release 1999).

3GPP TS 24.008, V10.0 (Dec. 2001), 3$^{rd}$ Generation Partnership Project; Tech. Spec. Group Core Network; Mobile Radio Interface Layer 3 Specification; Core Network Protocols—Stage 3 (Release 1999).

3GPP TS 25.331, V3.6.0 (Mar. 2001), 3$^{rd}$ Generation Partnership Project; Tech. Spec. Group Radio Access Network; RRC Protocol Specification (Release 1999).

U.S. Appl. No. 09/286,471, filed Apr. 6, 1999 entitled "Inter-System Handover—Generic Handover Mechanism".

Antipolis, S., "UE-UTRAN Radio Interface Protocol Architecture; Stage 2;" European Telecommunications Standards Institute, UMTS YY.01, V1.0.0, Dec. 1998, pp. 1-39.

Antipolis, S., UMTS Terrestrial Radio Access Network (UTRAN); UTRA FDD; (UMTS XX.03 V1.3.1), European Telecommunications Standards Institute, Feb. 1999, pp. 1-23.

U.S. Appl. No. 09/932,447, filed Aug. 20, 2001 entitled "Shared Network Support Over the 3GPP IUR Interface".

U.S. Appl. No. 10/068,012, filed Feb. 8, 2002, entitled "Handover In A Shared Radio Access Network Environment Using Subscriber Dependent Neighbor Cell Lists".

U.S. Appl. No. 10/068,001, filed Feb. 8, 2002, entitled "Coordinated Subscriber Access Handling for Shared Network Support".

U.S. Appl. No. 09/852,915, filed May 11, 2001 entitled "Releasing Plural Radio Connections with Omnibus Release Message".

International Preliminary Examination Report mailed Apr. 28, 2003 in corresponding PCT Application No. PCT/SE02/00248.

* cited by examiner

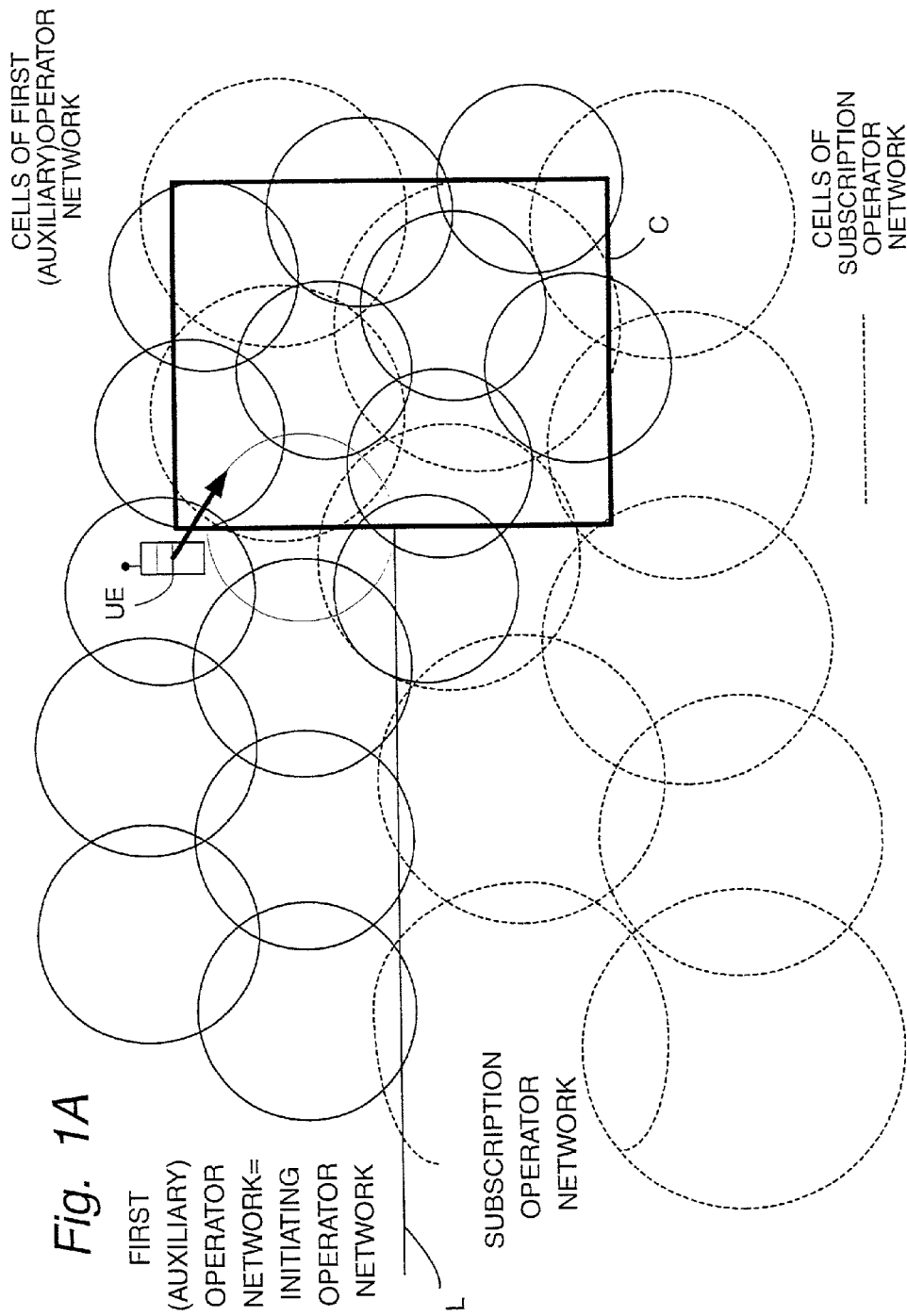

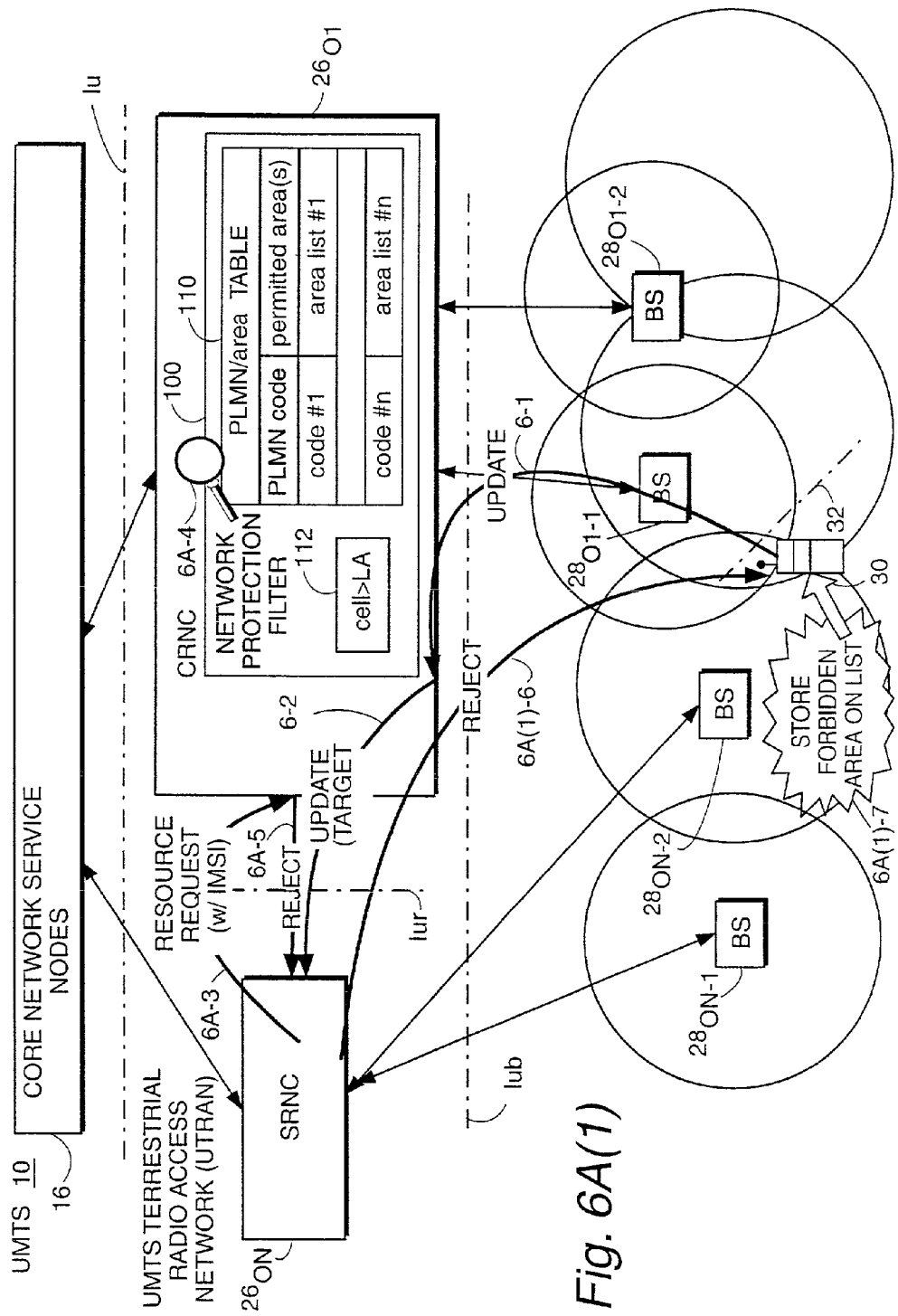
Fig. 6A(1)

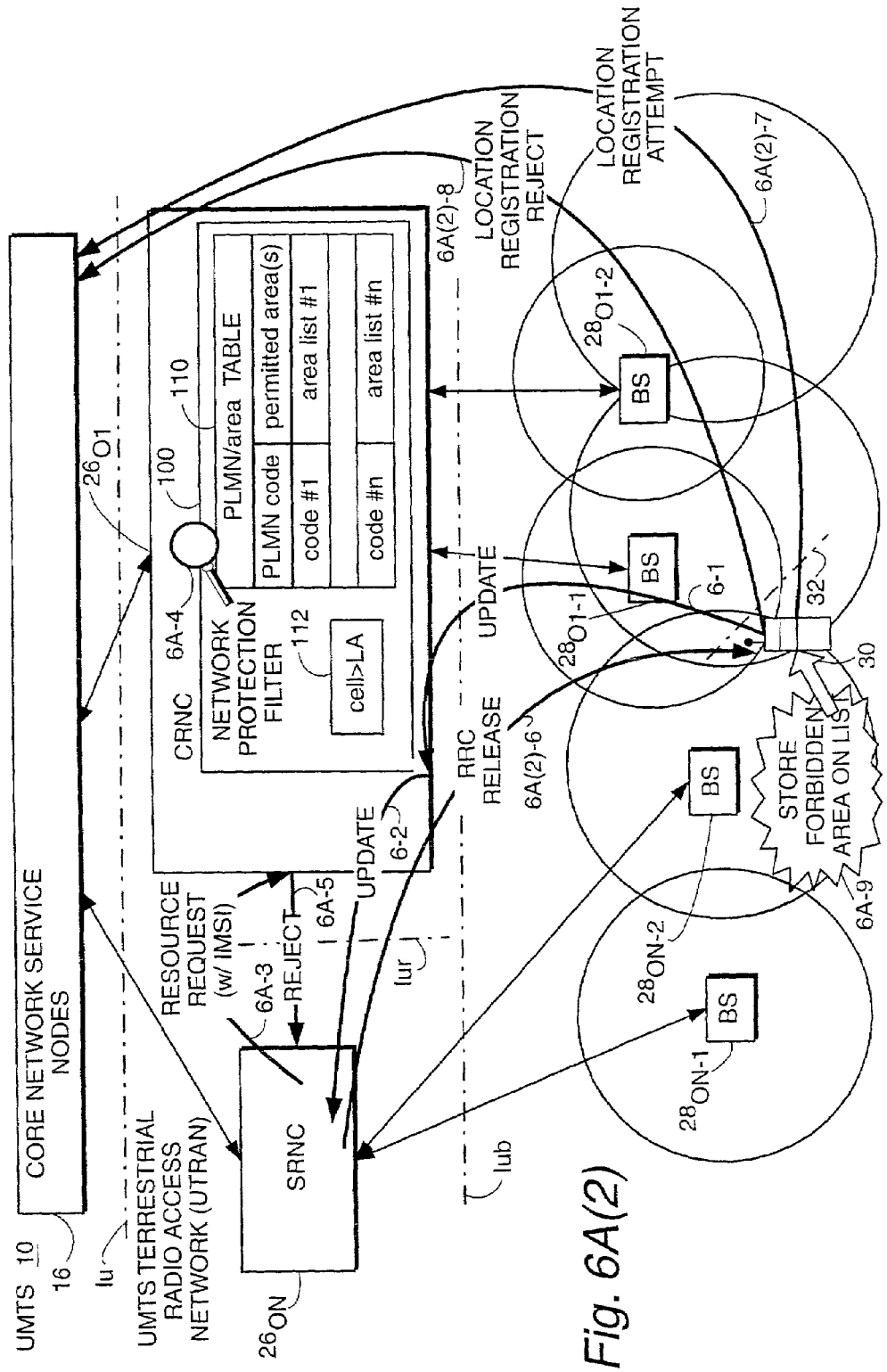
Fig. 6A(2)

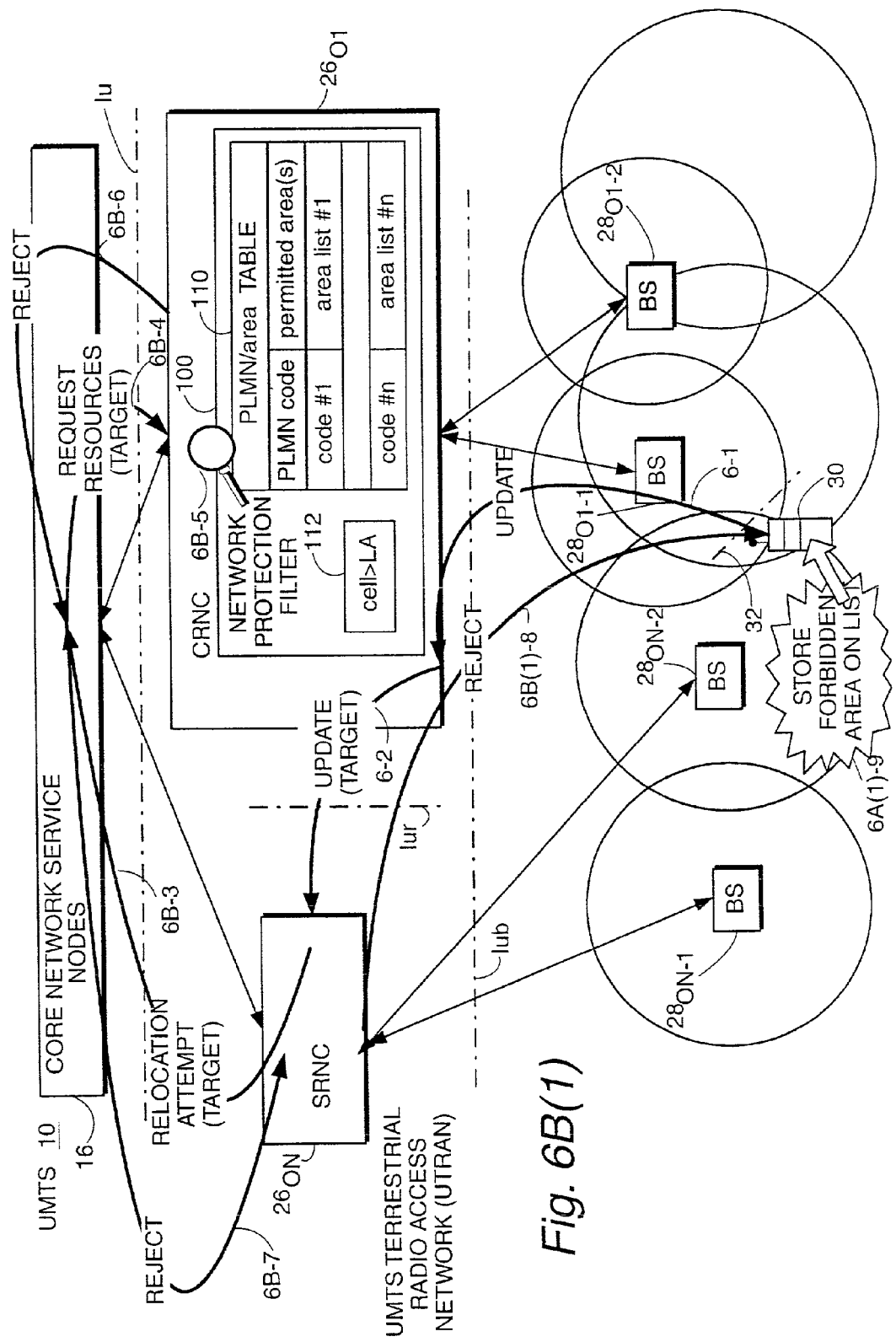
Fig. 6B(1)

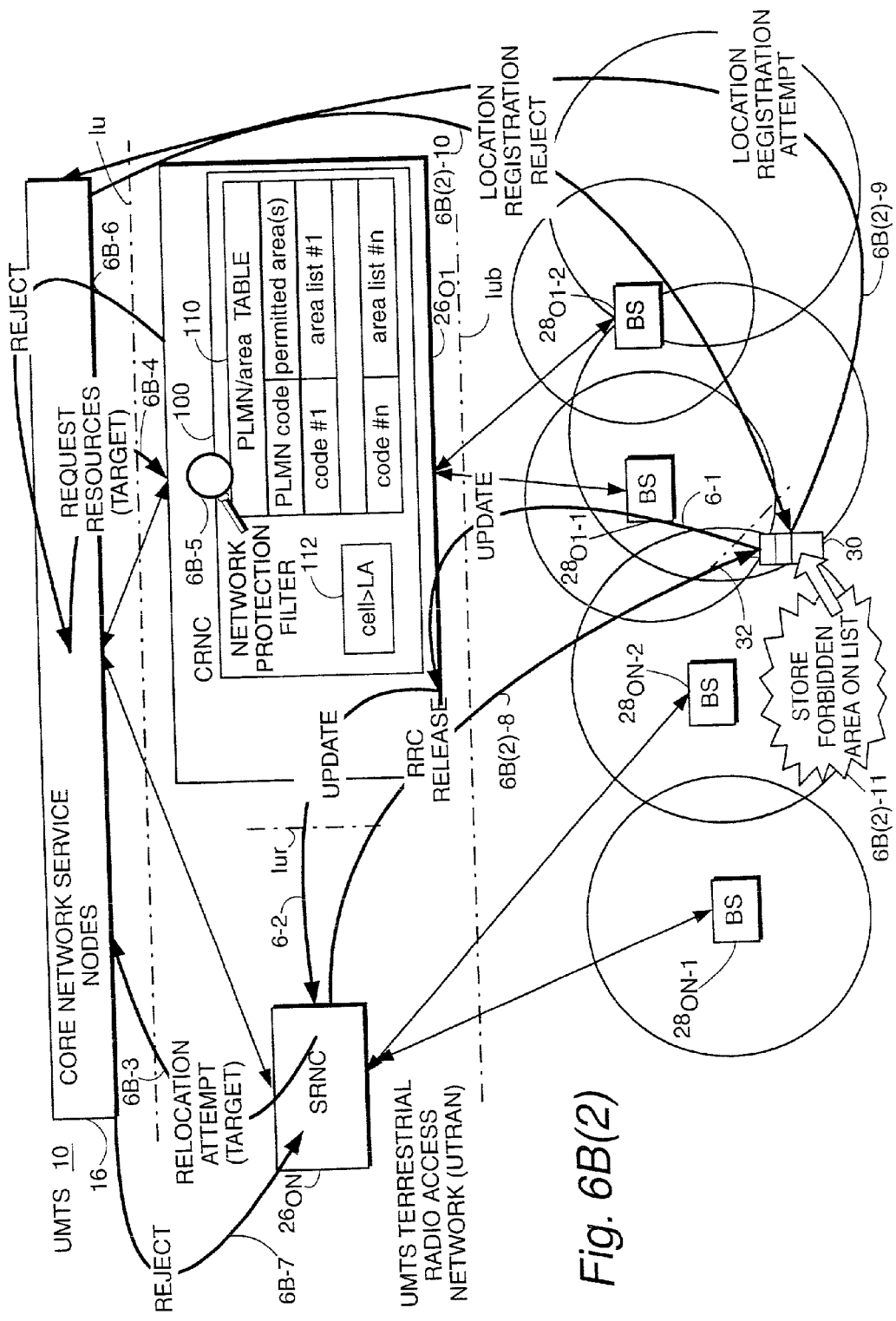
Fig. 6B(2)

PARTIAL SUPPORT OF MOBILITY BETWEEN RADIO ACCESS NETWORKS

This application is a continuation-in-part of U.S. patent application Ser. No. 09/268,471, File Apr. 6, 1999, entitled "Inter-System Handover—Generic Handover Mechanism", which is incorporated herein by reference in its entirety. This application further claims the benefit and priority of the following (all of which are incorporated herein by reference in their entirety): U.S. Provisional Patent Application No. 60/268,065, file Feb. 13, 2001, entitled "Handover In Shared Radio Access Network Environment Using Subscriber Dependent Neighbor Cell Lists"; U.S. Provisional Patent Application No. 60/301,442, filed Jun. 29, 2001, entitled "Partial Support of Mobility Between Radio Access Networks". This application is related to the following (all of which are incorporated herein by reference in their entirety): U.S. patent application Ser. No. 09/932,447, filed Aug. 20, 2001, entitled "Transmission of Filtering/Filtered Information Over the Iur Interface"; U.S. Provisional Patent Application No. 60/330,708, filed Oct. 29, 2001, entitled "Coordinated Subscriber Access Handling For Shared Network Support"; U.S. patent application Ser. No. 10/068,012, filed Feb. 13, 2001, entitled "Handover In A shared Radio Access Network Environment Using Subscriber Dependent Neighbor Cell Lists"; and, U.S. patent application Ser. No. 10/068,001, filed Feb. 13, 2002, entitled "Coordinated Subscriber Access Handling For Shared Network Support".

BACKGROUND

1. Field of the Invention

The present invention pertains to wireless telecommunications, and particularly to roaming of a mobile user equipment unit (UE).

2. Related Art and other Considerations

In a typical cellular radio system, mobile user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station. A cell is a geographical area where radio coverage is provided by the radio base station equipment at a base station site. Each cell is identified, typically by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

One example of a radio access network is the Universal Mobile Telecommunications (UMTS) Terrestrial Radio Access Network (UTRAN). The UTRAN is a third generation system which is in some respects builds upon the radio access technology known as Global System for Mobile communications (GSM) developed in Europe. UTRAN is essentially a wideband code division multiple access (W-CDMA) system. An endeavor know as the Third Generation Partnership Project (3GPP) is seeking to evolve yet further the UTRAN.

As those skilled in the art appreciate, in W-CDMA technology a common frequency band allows simultaneous communication between a user equipment unit (UE) and plural base stations. Signals occupying the common frequency band are discriminated at the receiving station through spread spectrum CDMA waveform properties based on the use of a high speed code, such as a pseudo-noise (PN) code. These high speed PN codes are used to modulate signals transmitted from the base stations and the user equipment units (UEs). Transmitter stations using different PN codes (or a PN code offset in time) produce signals that can be separately demodulated at a receiving station. The high speed PN modulation also allows the receiving station to advantageously generate a received signal from a single transmitting station by combining several distinct propagation paths of the transmitted signal. In CDMA, therefore, a user equipment unit (UE) need not switch frequency when handoff of a connection is made from one cell to another. As a result, a destination cell can support a connection to a user equipment unit (UE) at the same time the origination cell continues to service the connection. Since the user equipment unit (UE) is always communicating through at least one cell during handover, there is no disruption to the call. Hence, the term "soft handover." In contrast to hard handover, soft handover is a "make-before-break" switching operation.

The radio network controller (RNC) controls the UTRAN. In fulfilling its control role, the RNC manages resources of the UTRAN. Such resources managed by the RNC include (among others) the downlink (DL) power transmitted by the base stations; the uplink (UL) interference perceived by the base stations; and the hardware situated at the base stations.

There are several interfaces of interest in the UTRAN. The interface between the radio network controllers (RNCs) and the core network(s) is termed the "Iu" interface. The interface between a radio network controller (RNC) and its base stations (BSs) is termed the "Iub" interface. The interface between the user equipment unit (UE) and the base stations is known as the "air interface" or the "radio interface" or "Uu interface". In some instances, a radio connection involves both a Serving or Source RNC (SRNC) and a target or drift RNC (DRNC), with the SRNC controlling the radio connection but with one or more radio links of the radio connection being handling by the DRNC. An interface between radio network controllers (e.g., between a Serving RNC [SRNC] and a Drift RNC [DRNC]) is termed the "Iur" interface, and can be realized (for example) by an Inter-RNC transport link.

Those skilled in the art appreciate that, with respect to a certain RAN-UE connection, an RNC can either have the role of a serving RNC (SRNC) or the role of a drift RNC (DRNC). If an RNC is a serving RNC (SRNC), the RNC is in charge of the radio connection with the user equipment unit (UE), e.g., it has full control of the radio connection within the radio access network (RAN). A serving RNC (SRNC) is connected to the core network. On the other hand, if an RNC is a drift RNC (DRNC), its supports the serving RNC (SRNC) by supplying radio resources (within the cells controlled by the drift RNC (DRNC)) needed for the radio connection with the user equipment unit (UE). A system which includes the drift radio network controller (DRNC) and the base stations controlled over the Iub Interface by the drift radio network controller (DRNC) is herein referenced as a DRNC subsystem or DRNS.

When a radio connection between the radio access network (RAN) and user equipment unit (UE) is being established, the radio access network (RAN) decides which RNC is to be the serving RNC (SRNC) and, if needed, which RNC is to be a drift RNC (DRNC). Normally, the RNC that controls the cell where the user equipment unit (UE) is located when the radio connection is first established is initially selected as the serving RNC (SRNC). As the user equipment unit (UE) moves, the radio connection is maintained even though the user equipment unit (UE) may move into a new cell, possibly even a new cell controlled by another RNC. That other RNC becomes a drift RNCs (DRNC) for RAN-UE connection. An RNC is said to be the Controlling RNC (CRNC) for the base stations connected to it by an Iub interface. This CRNC role is not UE specific. The CRNC is, among other things, responsible for handling radio resource management for the cells in the base stations connected to it by the Iub interface.

In certain situations it its advantageous to transfer control of a particular UE connection from one RNC to another RNC. Such a transfer of control of the UE connection from one RNC to another RNC has been referred to as soft RNC handover, SRNC moveover, and SRNC relocation. A relocate function/procedure is provided to effect this transfer of control. This is a general function/procedure covering UMTS internal relocations (e.g., relocation of SNRC within the UMTS) as well as relocations to other systems (e.g., from UMTS to GSM, for example). SRNC relocation is described in various references, including the following example commonly assigned patent applications (all of which are incorporated herein by reference):

(1) U.S. patent application Ser. No. 09/035,821 filed Mar. 6, 1998, entitled "Telecommunications Inter-Exchange Measurement Transfer";

(2) U.S. Pat. No. 6,233,222 entitled "Telecommunications Inter-Exchange Congestion Control";

(3) U.S. Pat. No. 6,246,878 entitled "Multistage Diversity Handling For CDMA Mobile Telecommunications";

(4) U.S. Pat. No. 6,230,013 entitled "Diversity Handling Moveover For CDMA Mobile Telecommunications";

(5) U.S. patent application Ser. No. 09/732,877 filed Dec. 11, 2000, entitled "Control Node Handover In Radio Access Network";

(6) U.S. patent application Ser. No. 09/543,536 filed Apr. 5, 2000, entitled "Relocation of Serving Radio Network Controller With Signaling of Linking of Dedicated Transport Channels".

(7) U.S. patent application Ser. No. 09/829,001 filed Apr. 10, 2001, entitled "Connection Handling in SRNC Relocation".

SRNC relocation is intended to make more efficient use of the transmission network. Once the former SRNC is not needed, the connection to the core network is moved and the connection between the two RNCs (the former SRNC and the former DRNC over the Inter-RNC link) is disconnected.

For each mobile that the SRNC is serving, the SRNC stores a bit string which permanently identifies the mobile. According to the RAN system specified by the Third Generation Partnership Project (3GPP), this bit string is the IMSI, and is transferred to the SRNC from the CN using a Common ID procedure over the Iu interface at connection establishment. In the 3GPP approach, the structure of the IMSI is not recognized or used by the SRNC. It is only used to coordinate a paging from one CN domain with a connection that is ongoing for the other CN domain (matching two bit strings). The CRNC stores cell information for all cells which it controls.

Currently the Third Generation Partnership Project (3GPP) envisions some cooperation between mobile network operators. It may be, for example, that two (or more) operators each have their respective operator networks (e.g., a public mobile network network [PLMN]), and are cooperating in some parts of the coverage area (e.g. rural areas) but are competing in other areas (e.g. city areas). In the 3GPP parlance, the two networks are defined as "equivalent PLMNs" with regards to the cell selection process in a mobile terminal. This equivalence for cell selection enables the terminal to select cells of networks other than the operator's network to which the mobile terminal subscribes.

For example, as illustrated in FIG. 1, a network of a first operator may have cells (illustrated by solid line circles in FIG. 1) serving or covering primarily a northern half of the country (e.g. above line L in FIG. 1), while a network of a second operator may have cells (illustrated by dotted line circles in FIG. 1) serving or covering primarily a southern half of the country (e.g., below line L. in FIG. 1). Further, both the first operator and the second operator may serve a competition area (e.g., city) framed by line C in FIG. 1 (e.g., both operators have cells in the city/metropolitan area). The first and second operator should cooperate at least to the extent that the mobile terminal of a subscriber of the first operator who travels out of the first operator's network (e.g., below line L) should be able to establish mobile communication using the cells of the second operator, and vise versa.

Importantly, one of the operators (such as the first operator) may not wish for the mobile terminal subscribing to the other operator's network to use cells (e.g., of the first operator) in a region where the two operators have competing cells. For example, the first operator in FIG. 1 may not desire for a mobile terminal (UE), which subscribes to the subscription operators' network (e.g., the second operator's network in the case of FIG. 1) to use a cell of the first operator's network when the UE moves into the competition area C. Given the smaller cell size of the first operator's (solid line) cells in the competition area C of FIG. 1, and the greater number of cells provided by the first operator in the competition area C, the first operator likely may have invested considerably more in radio access network infrastructure that the second operator, providing better signal reception, traffic capacity, or coverage than the second operator. For these or other reasons, the first operator may wish to preclude the mobile terminal (which subscribes to the competing second operator's network) from using the (possibly superior) cells of the first operator, particularly since the second operator has provided competing cells in the same area.

For idle mode mobile terminals, the concept of "forbidden LA" (e.g., forbidden location area) results in rejection of access. When a mobile terminal is informed that a certain location area (LA) is forbidden, the mobile terminal has to find another LA (and will eventually select its own PLMN). Moreover, the mobile terminal also stores a list of forbidden LA which is used to avoid selecting a forbidden LA in the future when the mobile terminal is in its idle mode.

Whereas access rejection is currently feasible for idle mode mobile terminals, presently there is no way to stop connected mode terminals belonging to a competitor's network from accessing cells in another network. What can happen, therefore, is that (in the competition area) a first operator may invest extensively to provide quality coverage, while the competing second operator may try to save money by providing poorer coverage, since the subscribers of the second operator's network can still reuse the coverage of the other first operator's network. Such considerations undermine both effective competition and cooperation.

What is needed, therefore, and an object of the present invention, is a technique for precluding or rejecting accesses, in competition areas, to cells of a first operator's network attempted by or on behalf of a mobile terminal which subscribes to a second operator's network.

BRIEF SUMMARY

Ordinarily a radio access network of an auxiliary (first) operator network has cells which are eligible for utilization by a user equipment unit (UE) which is in a connected mode and which subscribes to a subscription (second) operator's network. However, the present invention precludes or rejects attempted utilization (by a user equipment unit (UE) which subscribes to its subscription operator network) of a restricted cell, the restricted cell being any cell of the auxiliary operator network for which the subscription operator network has a competing cell. The rejected attempted utilization can be one of (1) handover to the restricted cell, and (2) cell/URA updating by the user equipment unit (UE) via the restricted cell. Further, preclusion of attempted utilization of the restricted cell occurs when the user equipment unit (UE) attempts cell reselection. Thus, in an example implementation, the rejection/preclusion encompasses the user equipment unit (UE) being in a connected mode in one of a cell_DCH state, a cell_FACH state, a cell_PCH state; a URA_PCH state; and a URA_PCH state.

In its various aspects, the invention concerns a radio access network which performs a rejection necessary to protect the restricted cell, as well as a control node of such radio access network and a operator filter of such control node.

When a handover is attempted toward a target cell of the auxiliary operator network with respect to the user equipment unit (UE) which subscribes to the subscription operator network, the protecting control node of the auxiliary operator network obtains, from an initiating operator's network, an international mobile subscriber identity (IMSI) of the user equipment unit (UE) and an identification of the target cell sought by the handover. The protecting control node uses the IMSI to determine whether the target cell is a restricted cell, and (if so) notifies the initiating operator's network that the handover is rejected. The international mobile subscriber identity (IMSI) of the user equipment unit (UE) and the identification of the target cell sought by the handover can be obtained from a source radio network controller (SRNC) of the initiating operator network. When the user equipment unit (UE) is in a cell_DCH state, in one illustrated embodiment the international mobile subscriber identity (IMSI) of the user equipment unit (UE) and the identification of the target cell are particularly obtained from a RL SETUP REQUEST message issued by the source radio network controller (SRNC) of the initiating operator network. In determining whether the target cell is a restricted cell, the protecting control node of the auxiliary operator network obtains a PLMN code from the IMSI of the user equipment unit (UE), and consults a table to determine (on the basis of the obtained PLMN code) whether the target cell is eligible for handover for the user equipment unit (UE).

In addition to or in conjunction with an attempted handover, the second operator network can also attempt to perform a type of handover known as a hard handover with SRNC relocation, which (in the context of the present invention) is a transfer of a SRNC role from a radio network controller (RNC) of the subscription operator network to a radio network controller (RNC) of the auxiliary operator network. In such case, the protecting control node of the auxiliary operator network obtains the international mobile subscriber identity (IMSI) of the user equipment unit (UE) and an identification of the target cell from the core network. Then, the protecting control node determines whether the target cell is a restricted cell (in like manner with the handover evaluation/rejection), and (if so) notifies the core network that the handover with relocation is rejected. In an illustrated implementation, the protecting control node obtains the international mobile subscriber identity (IMSI) of the user equipment unit (UE) and the identification of the target cell in a RELOCATION REQUEST message from the core network.

The invention has wide applicability, regardless to which network the SRNC may be located (e.g., regardless of the identity of the initiating operator network). For example, the source RNC can be within the subscription operator network. Alternatively, the source SRNC may be in the auxiliary (first) operator network (e.g., the procedures of the invention are used between two radio network controllers within the auxiliary operator network). Yet further, the source SRNC may be in another country (e.g., a third operator network), with the mobile terminal (UE) just moving into an area of the two cooperating/competing operator networks.

The attempted utilization can also be an attempted cell update performed by the user equipment unit (UE) via the restricted cell. Typically in performing a cell update the user equipment unit (UE) is in either a cell_FACH state or a cell_PCH state. When the user equipment unit (UE) attempts to perform a cell update to a target cell of the auxiliary operator network, the protecting control node also obtains, from the subscription operator network, the international mobile subscriber identity (IMSI) of the user equipment unit (UE) and the identification of the target cell. Then, in like manner with the attempted handover, the protecting control node determines whether the target cell is a restricted cell, and (if so) provides a notification that the cell update is rejected. In an example implementation, in conjunction with the attempted cell update the protecting control node receives the international mobile subscriber identity (IMSI) of the user equipment unit (UE) and the identification of the target cell from a COMMON TRANSPORT CHANNEL RESOURCES REQUEST message issued by the source radio network controller (SRNC) of the subscription operator network.

Preclusion of attempted utilization of the restricted cell also occurs when the user equipment unit (UE) attempts cell reselection. Attempted cell reselection by the user equipment unit (UE) can occur, in an illustrated example embodiment, when the user equipment unit (UE) is in either a cell_PCH state, a cell_FACH state, or a URA_PCH state. When there is an attempted utilization by the user equipment unit (UE) of the restricted cell, the auxiliary operator network prompts transmission of an identification of the restricted cell from the first operator network to the user equipment unit (UE).

In one of its aspects, the present invention concerns a mobile terminal which subscribes to its native operator network and which, in a connected mode and prior to cell reselection to a target cell, checks whether the target cell is a restricted area. Here again the restricted area is considered as being both operated by the auxiliary or foreign operator network and competing with a cell operated by the native or subscription operator network. In an example implementation, the location area identity (LAI) broadcasted from each cell is used, and the mobile terminal maintains a list of restricted location area identities which is consulted as a part of the checking. In one example mode, the mobile terminal updates the list of restricted LAIs when the location registration to a core network via the restricted cell is rejected by the core network with information that this LAI is restricted. In another example mode, the mobile terminal updates the list of restricted LAIs when receiving a rejection of an attempted cell update (which includes information that this LAI is restricted). A further example is that the mobile terminal maintains a list of restricted cells, and upon rejection of cell update, is informed by the network that this particular cell is restricted. After a mobile terminal finds that a target cell is restricted, the mobile terminal no longer attempts to access that cell but instead searches for other cells.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 1A is a diagrammatic view showing network topology for illustrating a second scenario of the invention.

FIG. 6A(1), FIG. 6A(2), FIG. 6B(1), and FIG. 6B(2) are partially schematic, partially diagrammatic views showing respective modes of solution components of the present invention for, and if necessary rejecting, a cell update attempt.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 1:
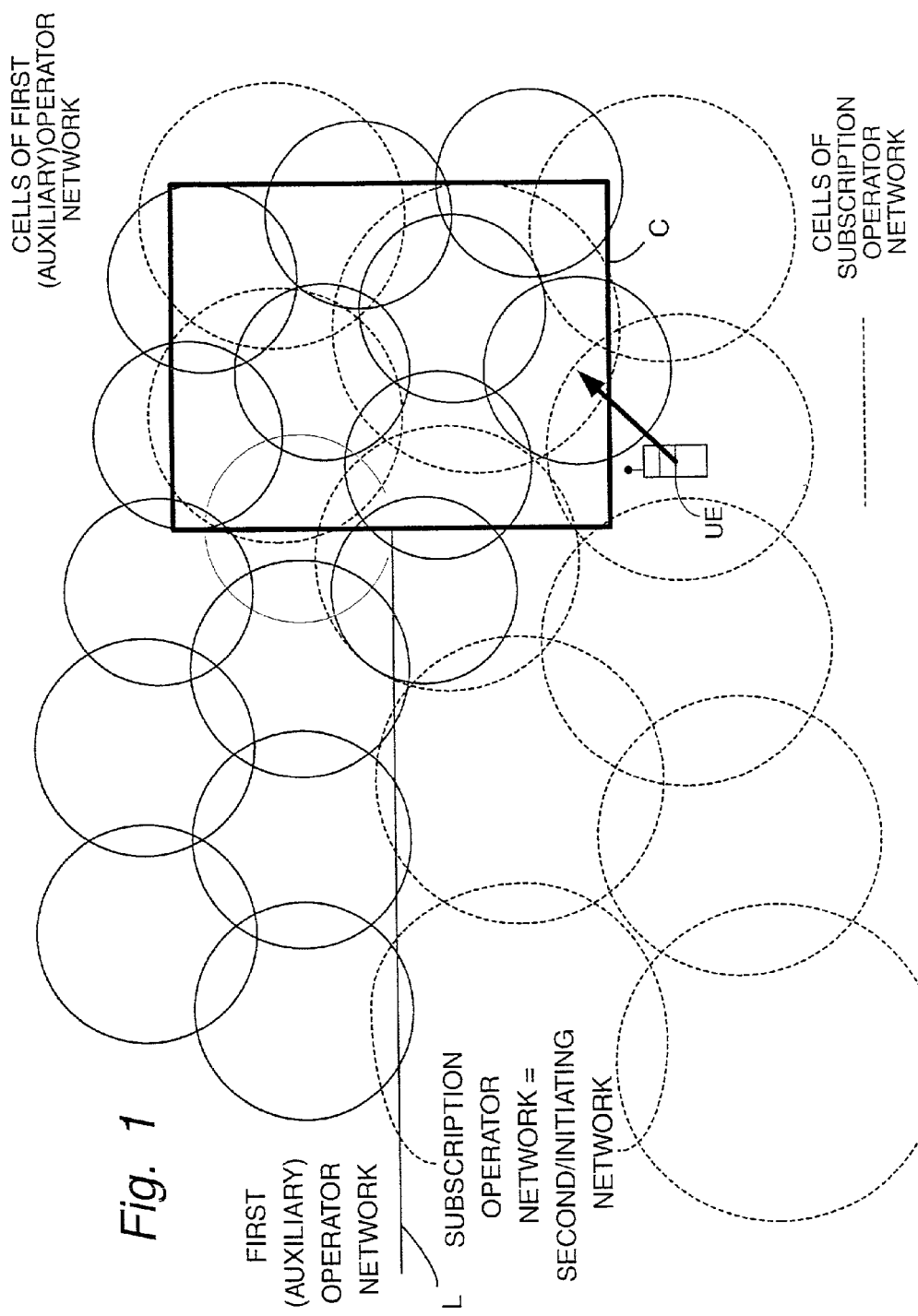
FIG. 1 is a diagrammatic view showing network topology for illustrating a first scenario of the invention, the network topology including two operator networks (PLMNs) which in some geographical areas cooperate while in another geographical area compete.

Returning to the illustration of FIG. 1, the first operator's network (depicted by solid line cells) will be referred to as an auxiliary operator network (e.g., PLMN) while the operator network depicted by dotted line cells will be referred to and considered a "subscription" operator network in the sense that, in the ensuing discussion, the mobile terminal involved in a connected mode is the subject of a subscription contract with the subscription network. As previously noted, as employed herein, the term "user equipment unit (UE)" shall encompass all types of mobile terminals.

Outside of competition area C, the cells of the first (auxiliary) operator's network are eligible for utilization by a user equipment unit (UE) which is in a connected mode and which subscribes to its subscription operator's network. However, the present invention precludes or rejects attempted utilization of a restricted cell of the first operator's network by a user equipment unit (UE) which subscribes to another operator network (e.g., the subscription (second) operator's network). A restricted cell is any cell of the auxiliary operator network for which the subscription operator network has a competing cell, e.g., is in competition area C. As described in more detail hereinafter, the rejected attempted utilization can be one of (1) handover to the restricted cell, and (2) cell/URA updating by the user equipment unit (UE) via the restricted cell. Further, preclusion of attempted utilization of the restricted cell occurs when the user equipment unit (UE) attempts cell reselection. The rejection/preclusion thus encompasses the user equipment unit (UE) being in a connected mode in one of a cell_DCH state, a cell_FACH state, a cell_PCH state; and a URA_PCH state Before describing the inter-network competition/cooperation features of the present invention, a brief description of selected portions of an illustrative implementation of an example radio access network is provided. The illustrative, non-limiting, example implementation is in the context of a universal mobile telecommunications (UMTS) 10 shown in FIG. 2.

Figure 2:
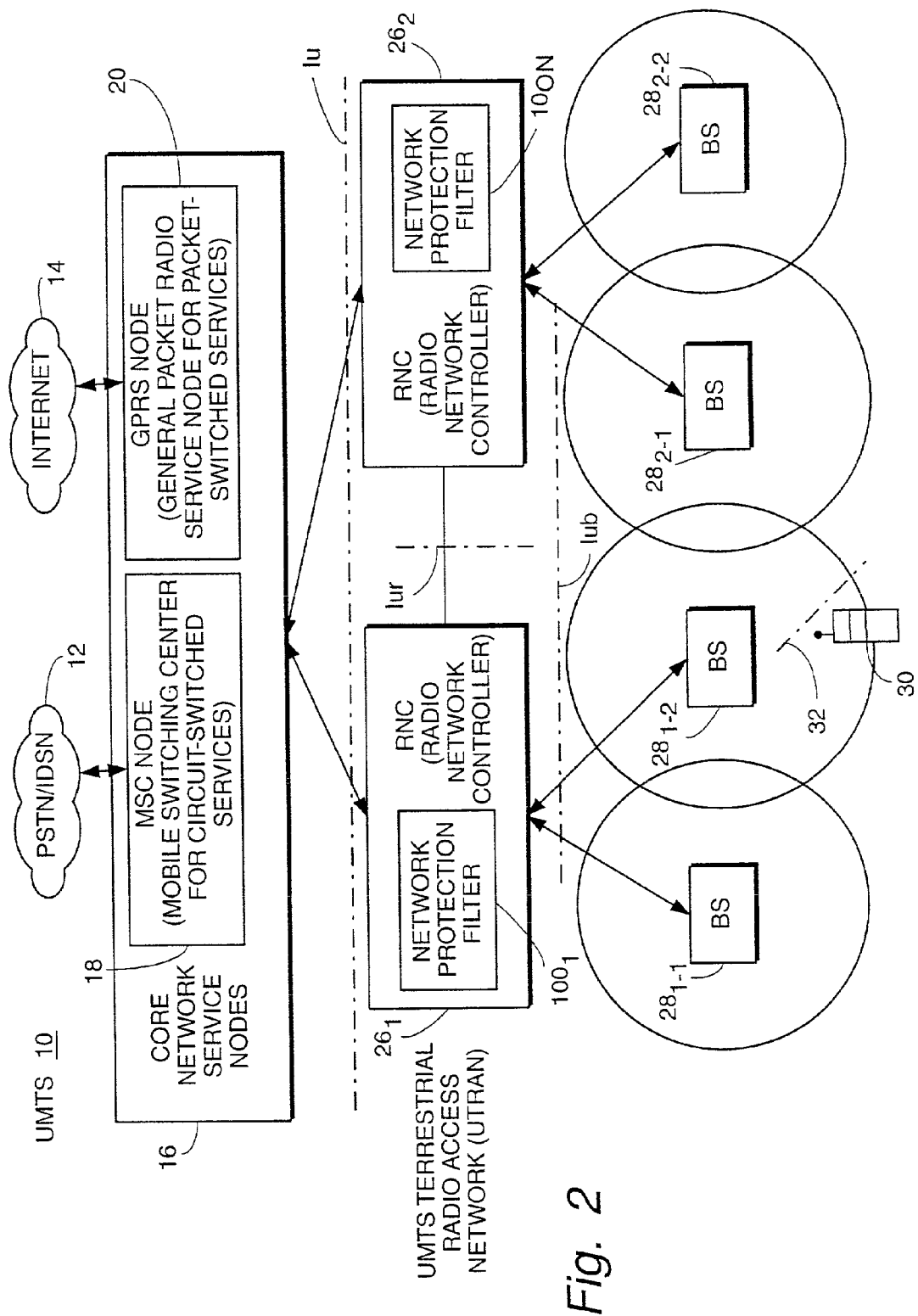
FIG. 2 is a schematic view of portions of an example, representative telecommunications system which serve as an example, non-limiting implementation of embodiments of the present invention.

A representative, connection-oriented, external core network, shown as a cloud 12 of FIG. 2 may be for example the Public Switched Telephone Network (PSTN) and/or the Integrated Services Digital Network (ISDN). A representative, connectionless external core network shown as a cloud 14, may be for example the Internet. Both core networks are coupled to corresponding service nodes 16. The PSTN/ISDN connection-oriented network 12 is connected to a connection-oriented service node shown as a Mobile Switching Center (MSC) node 18 that provides circuit-switched services. The Internet connectionless-oriented network 14 is connected to a General Packet Radio Service (GPRS) node 20 tailored to provide packet-switched type services which is sometimes referred to as the serving GPRS service node (SGSN).

Each of the core network service nodes 18 and 20 connects to a UMTS Terrestrial Radio Access Network (UTRAN) 24 over a radio access network (RAN) interface referred to as the Iu interface. UTRAN 24 includes one or more radio network controllers (RNCs) 26. For sake of simplicity, the UTRAN 24 of FIG. 1 is shown with only two RNC nodes, particularly RNC $26_1$, and RNC $26_2$. Each RNC 26 is connected to a plurality of base stations (BS) 28. For example, and again for sake of simplicity, two base station nodes are shown connected to each RNC 26. In this regard, RNC $26_1$ serves base station $28_{1\text{-}1}$ and base station $28_{1\text{-}2}$, while RNC $26_2$ serves base station $28_{2\text{-}1}$ and base station $28_{2\text{-}2}$. It will be appreciated that a different number of base stations can be served by each RNC, and that RNCs need not serve the same number of base stations. Moreover, FIG. 2 shows that an RNC can be connected over an Iur interface to one or more other RNCs in the URAN 24.

In the illustrated embodiments, for sake of simplicity each base station 28 is shown as serving one cell. Each cell is represented by a circle which surrounds the respective base station. It will be appreciated by those skilled in the art, however, that a base station may serve to communicate across the air interface for more than one cell. For example, two cells may utilize resources situated at the same base station site.

A user equipment unit (UE), such as user equipment unit (UE) 30 shown in FIG. 2, communicates with one or more cells or one or more base stations (BS) 28 over a radio or air interface 32. Each of the radio interface 32, the Iu interface, the Iub interface, and the Iur interface are shown by dash-dotted lines in FIG. 2.

Preferably, radio access is based upon Wideband, Code Division Multiple Access (WCDMA) with individual radio channels allocated using CDMA spreading codes. Of course, other access methods may be employed. WCDMA provides wide bandwidth for multimedia services and other high transmission rate demands as well as robust features like diversity handoff and RAKE receivers to ensure high quality. In cell_DCH state, each user mobile station or equipment unit (UE) 30 is assigned its own scrambling code in order for a base station 28 to identify transmissions from that particular user equipment unit (UE) as well as for the user equipment unit (UE) to identify transmissions from the base station intended for that user equipment unit (UE) from all of the other transmissions and noise present in the same area.

Different types of channels may exist between one of the base stations 28 and user equipment units (UEs) 30 for transport of control and user data. For example, in the forward or downlink direction, there are several types of broadcast channels including a general broadcast channel (BCH), a paging channel (PCH), a common pilot channel (CPICH), and a forward access channel (FACH) for providing various other types of control messages to user equipment units (UEs). The forward access channel (FACH) is also used to carry user data. In the reverse or uplink direction, a random access channel (RACH) is employed by user equipment units (UEs) whenever access is desired to perform location registration, call origination, page response, and other types of access operations. The random access channel (RACH) is also used for carrying certain user data, e.g., best effort packet data for, e.g., web browser applications. Dedicated channels (DCH) may be allocated to carry substantive call communications with a user equipment unit (UE).

The present invention, which can be implemented in the example context of the telecommunications system of FIG. 2, particularly concerns a new and improved technique for fostering cooperation and competition between operator networks. As one of its aspects implementing this new technique, one or more of the radio network controllers 26 perform a network protecting function, and therefore are referenced herein as "protecting" nodes, or "protecting" control nodes. Accordingly, as an illustrative, non-limiting example implementation, the radio network controllers 26 of FIG. 2 are shown as including a network protection filter 100. As described in more detail below, this protecting function, as implemented e.g., by network protection filter 100, precludes or rejects attempted utilization of a restricted cell of the first (auxiliary) operator's network by the user equipment unit (UE) 30, assuming user equipment unit (UE) 30 subscribes to another operator network (e.g., the subscription (second) operator's network).

Figure 3:
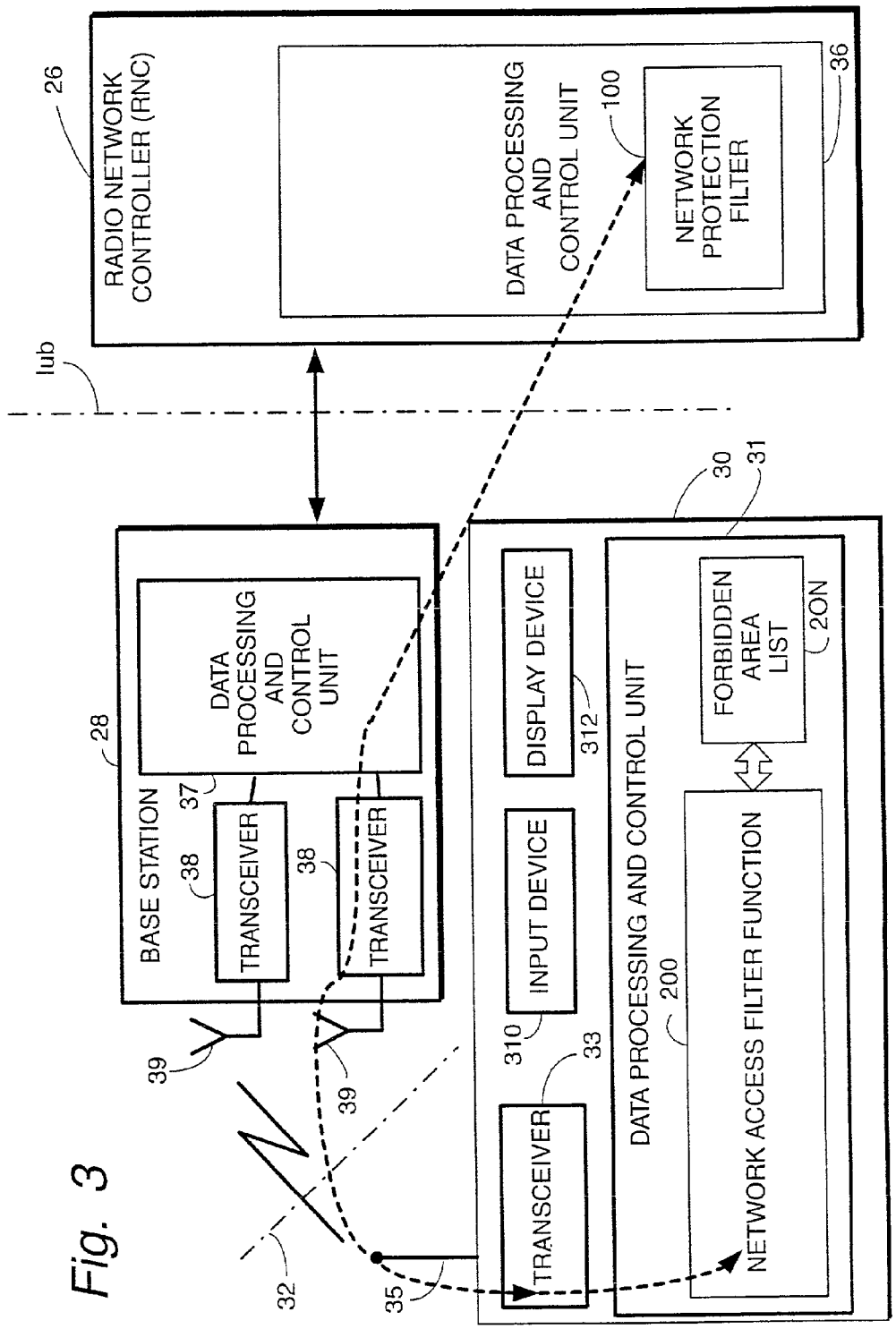
FIG. 3 is a diagrammatic view showing various aspects of a user equipment unit (UE), together with certain basic aspects of a base station node and a radio network controller node.

FIG. 3 shows selected general aspects of user equipment unit (UE) 30 and illustrative nodes such as radio network controller 26 and base station 28. The user equipment unit (UE) 30 shown in FIG. 3 includes a data processing and control unit 31 for controlling various operations required by the user equipment unit (UE). The UE's data processing and control unit 31 provides control signals as well as data to a radio transceiver 33 connected to an antenna 35. In addition to other functionalities herein after described, the user equipment unit (UE) 30 can have user-interactive or user-viewable devices, such as an input device 310 and a display device 312.

The example radio network controller 26 and base station 28 as shown in FIG. 3 are radio network nodes that each include a corresponding data processing and control unit 36 and 37, respectively, for performing numerous radio and data processing operations required to conduct communications between the RNC 26 and the user equipment units (UEs) 30. Part of the equipment controlled by the base station data processing and control unit 37 includes plural radio transceivers 38 connected to one or more antennas 39.

Figure 7:
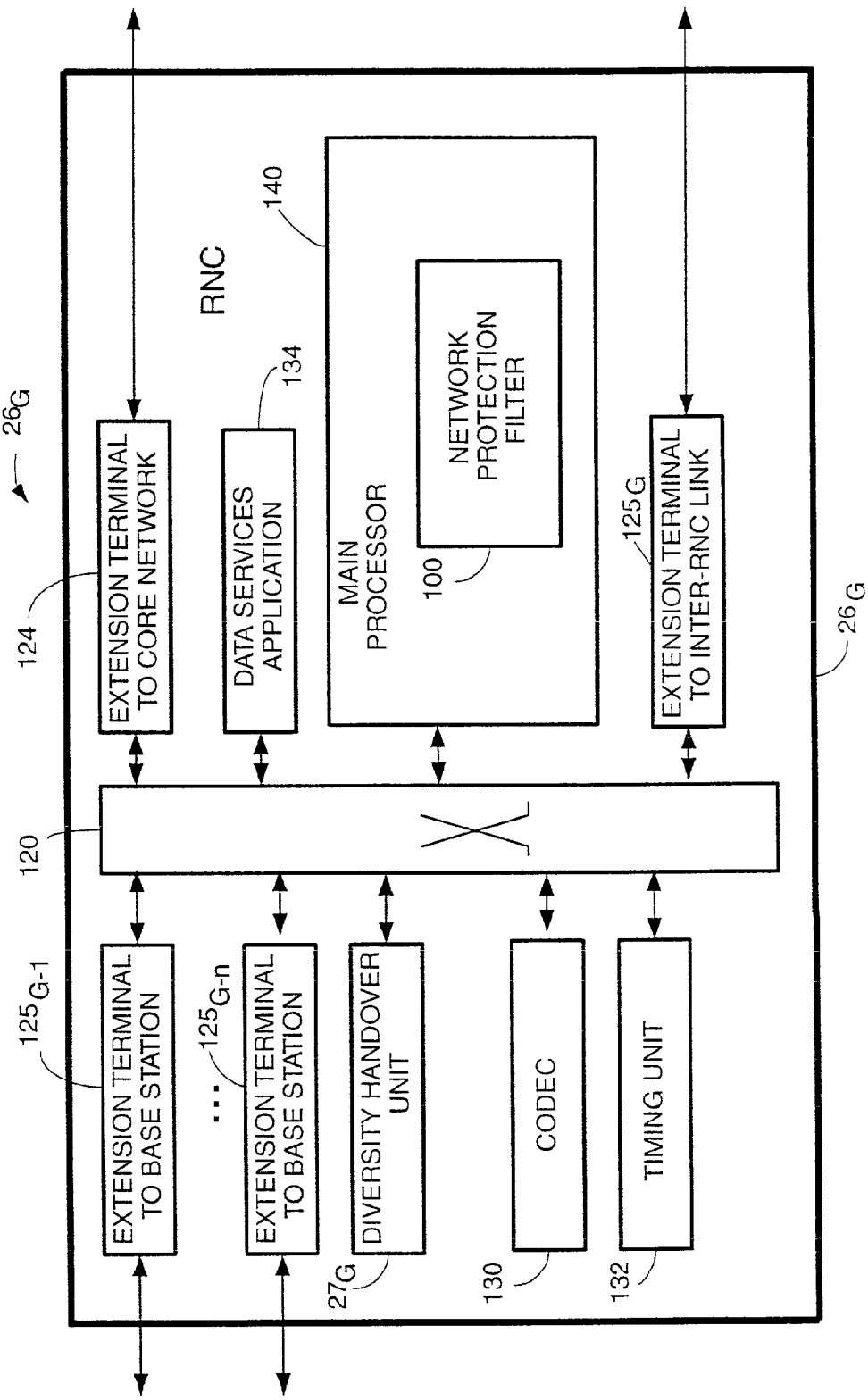
FIG. 7 is a schematic view of an example, representative RNC node which can be utilized with an implementation of the invention.

FIG. 7 illustrates, in somewhat more detail, an example non-limiting RNC node $26_G$ of the present invention. RNC node $26_G$ of FIG. 7 can represent an serving RNC (SRNC) or a drift RNC (DRNC). It so happens that the RNC node 26 of FIG. 7 is a switched-based node having a switch 120. The switch 120 serves to interconnect other constituent elements of RNC node $26_G$. Such other constituent elements include extension terminals [ETs] $125_{G\text{-}1}$ through $125_{G\text{-}n}$, extension terminal $125_1$ which connects RNC node $26_G$ via the inter-RNC link 29 to another radio network controller; and extension terminal 124. Extension terminals $125_{G\text{-}1}$ through $125_{G\text{-}n}$ essentially function to connect RNC node $26_G$ to the base stations 28 served by RNC node $26_G$; extension terminal 124 connects RNC node 26 across the Iu interface to the core network 16. Yet other constituent elements of RNC node $26_G$ include diversity handover unit $27_G$; codex 130; timing unit 132; a data services application unit 134; and, a main processor 140. In the example non-limiting RNC node $26_G$, the network protection filter 100 is shown as being implemented in main processor 140. However, it should be understood that network protection filter 100 can be implemented using individual hardware circuits, using software functioning in conjunction with a suitably programmed digital microprocessor or general purpose computer, using an application specific integrated circuit (ASIC), and/or using one or more digital signal processors (DSPs).

The sample implementation of FIG. 2 thus serves as an example network, the architecture of which can be utilized by one or more of the auxiliary (first) operator's network and the subscription (second) operator's network. It should be understood, however, that such architectural example is not constraining to the present invention.

Figure 4:
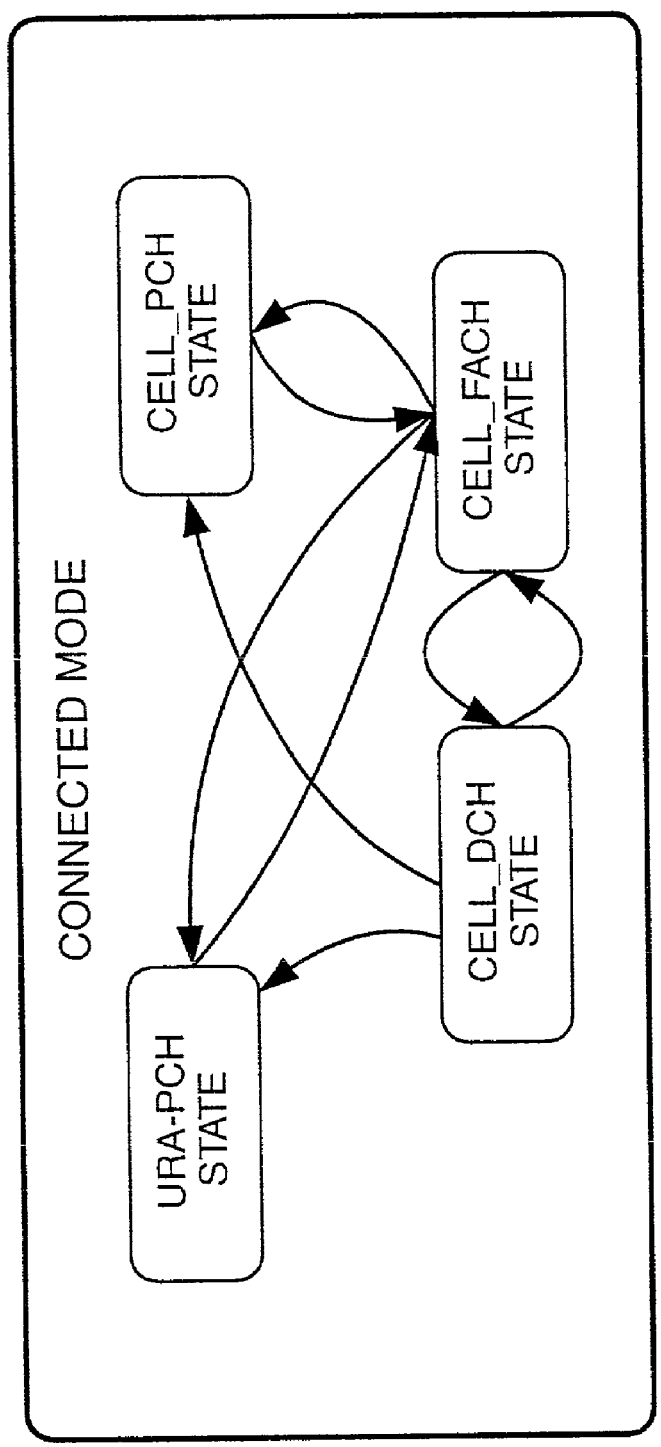
FIG. 4 is a diagrammatic view showing connected mode states of a user equipment unit (UE) pertinent to the present invention.

As mentioned above, a problem is that the prior art does not offer any network protection with respect to a user equipment unit (UE) in its connected mode. The present invention overcomes this problem with three solution components. For the illustrated embodiments, these solution components are described briefly below in terms of 3GPP terminology. The 3GPP terminology subsumes an understanding of various states which can be acquired by a user equipment unit (UE) in its connected mode. Four of these states—the cell_DCH state, the cell_FACH state, the URA_PCH state; and the cell_PCH state—are germane to the present invention. These germane 3GPP connection mode states illustrated in FIG. 4 and are each briefly described below. Each connected mode state reflects a different level of activity.

The cell_DCH state is characterized in that there is a dedicated channel (DCH) assigned to the user equipment unit (UE). Macro-diversity may be used between DCHs of several cells. In the cell_DCH state, there is a dedicated control channel (DCCH) used for transmission of signalling messages between the user equipment unit (UE) and the UTRAN.

In the cell_FACH state, no dedicated physical channel is assigned, but the user equipment unit (UE) listens continuously to a common channel (the FACH) in the downlink belonging to the selected cell. In the uplink, the user equipment unit (UE) typically uses a random access channel (RACH). At each cell reselection, the user equipment unit (UE) updates the network with its current cell location. In this state, there is a dedicated control channel (DCCH) used for transmission of signalling messages between the user equipment unit (UE) and the UTRAN. The DCCH is implemented by appending the Radio Network Temporary Identity (U-RNTI or C-RNTI) to all signalling messages, and thus addressing an individual UE. The U-RNTI (UTRAN RNTI) is a global identity, which can be used in any cell in the UTRAN. The C-RNTI (Cell RNTI) is only significant in a single cell, and has to be reallocated in every cell. On the other hand, C-RNTI is much shorter than the U-RNTI which saves space over the radio interface when it is used. There is also a CCCH (Common control channel) in this state, which is used when the connection to the SRNC is not available, such at after cell reselection over RNC borders, when the CELL UPDATE or URA UPDATE message is sent to the DRNC.

In the cell_PCH state, the user equipment unit (UE) monitors a paging channel (PCH) of a selected cell. On the PCH, the user equipment unit (UE) uses discontinuous reception (DRX) to save power, and the scheme for when to listen is agreed between the network and the user equipment unit (UE) on a per user equipment unit (UE) basis. Also in the cell_PCH state the user equipment unit (UE) updates the network with its current cell location at cell reselection. No DCCH is available in the cell_PCH state. On the PCH, means for addressing individual user equipment units (UEs) exist (using the U-RNTI), but the user equipment unit (UE) can not transport any signalling messages to the network.

The URA_PCH state is almost identical to the cell_PCH state. The difference is that the user equipment unit (UE) does only update the network of its location after crossing URA borders. An URA (UTRAN Registration Area) is a group of cells. This means that in this state the position of the user equipment unit (UE) is in general known only on URA level.

Having briefly described the connected mode states for a user equipment unit (UE), the solution components presented by the present invention are now introduced:

(1) A first solution component is that a UE in cell_DCH state cannot be handed over to a cell of the competing network in the competition area.

(2) A second solution component is that the auxiliary (first) operator's network is able to reject accesses (cell update) from a UE in cell_FACH or cell_PCH state to a cell of the competitor network in the competition area.

(3) A third solution component is that a UE in cell_FACH or cell_PCH state has functions which avoid selecting cells of the competitors network in the competition area, even though this network is considered "equivalent" from cell selection point of view.

Figure 5A:
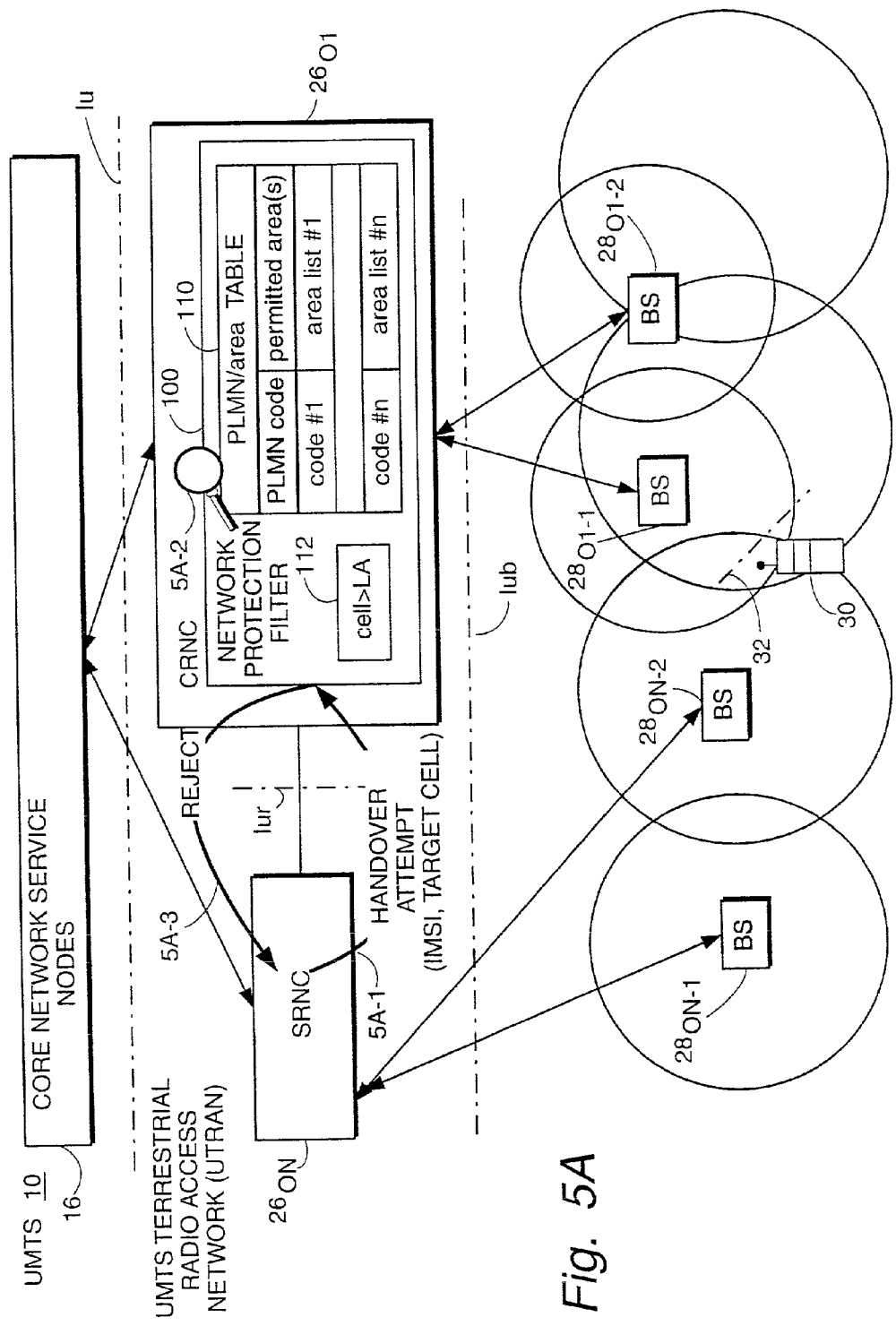
FIG. 5A and FIG. 5B are partially schematic, partially diagrammatic views showing respective modes of solution components of the present invention for evaluating, and if necessary rejecting, a handover attempt.

Each of these solution components is separately discussed below with illustrations such as FIG. 5A. In FIG. 5A and various ensuing illustrations, nodes of the auxiliary (first) operator's network are illustrated in solid lines, while nodes of the initiating operator's network are illustrated in broken lines. The initiating operator network is a network which requests a SRNS relocation or handover with relocation. Moreover, in these illustrations, any subscript including "O1" refers to an aspect of the auxiliary (first) operator's network, while any subscript including "ON" refers to an aspect of the initiating operator's network. Furthermore, the radio network controller $26_{O1}$ of the auxiliary (first) operator's network is currently referred to as the CRNC, while the radio network controller $26_{ON}$ of the subscription (second) operator's network is currently designated as the SRNC. An inter-RNC link is shown as connecting the radio network controller $26_{O1}$ of the auxiliary (first) operator's network and the radio network controller $26_{ON}$ of the initiating operator's network.

Figure 1B:
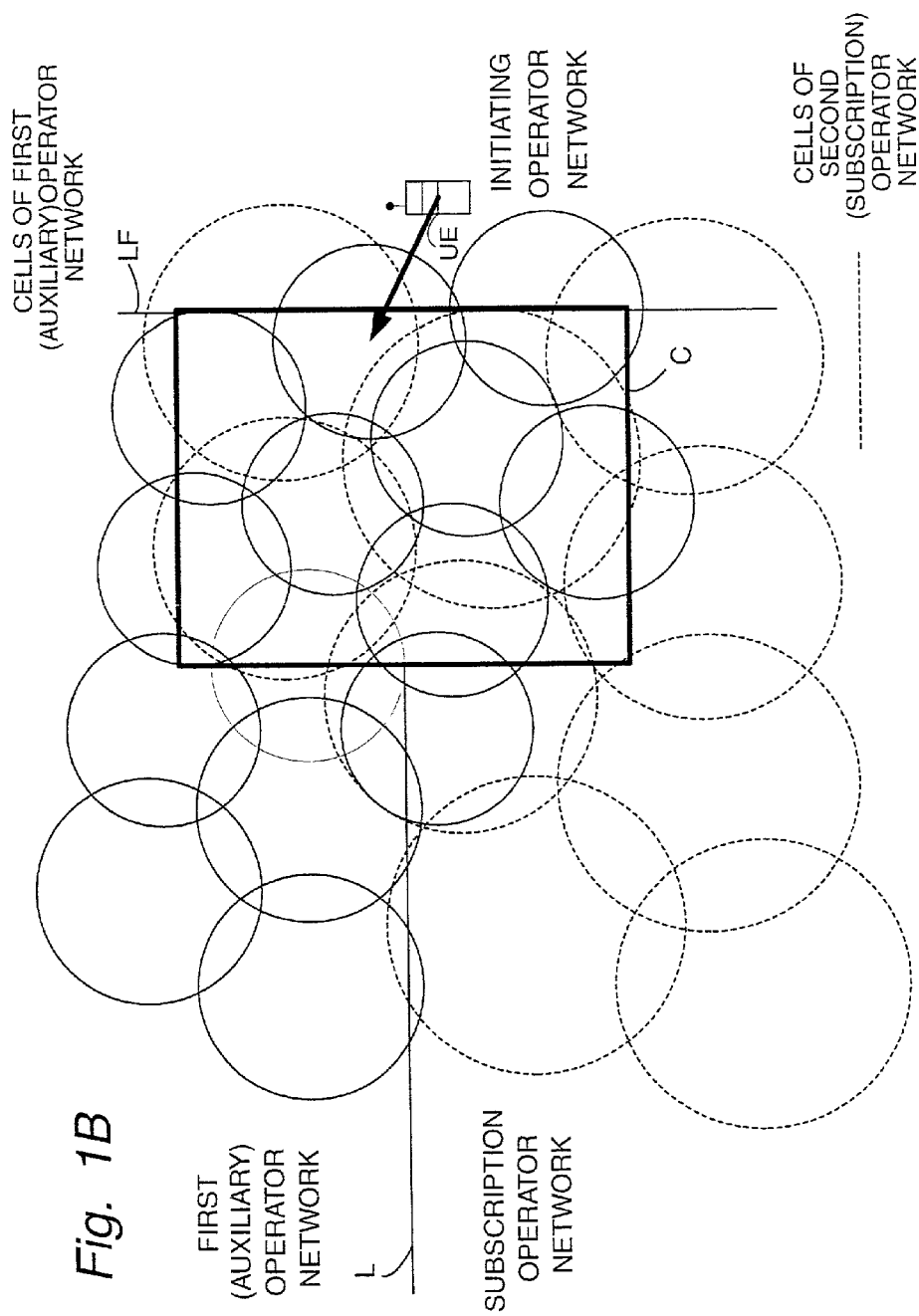
FIG. 1B is a diagrammatic view showing network topology for illustrating a third scenario of the invention

The invention has wide applicability, regardless to which network the radio network controller $26_{ON}$ may belong or be located (e.g., regardless of the identity of the initiating operator network). For example, as in the situation shown in FIG. 1, the initiating operator network may be the subscription operator network, with the source SRNC therefore being within the subscription operator network. Alternatively, as shown in FIG. 1A, the source SRNC may be in the auxiliary (first) operator network (e.g., the procedures of the invention are used between two radio network controllers within the auxiliary operator network). Yet further, as shown in FIG. 1B, the source SRNC may belong to an initiating operator network in another country (e.g., the initiating operator network is a third operator network [not the auxiliary operator network or the subscription operator network]), with the mobile terminal (UE) just moving from the (foreign) initiating into an area of the two cooperating/competing operator networks (the auxiliary operator network and the subscription operator network). Thus, it should be understood that the notation (e.g., subscript) "ON" as employed herein is not limited as referring to any particular initiating operator network, but can refer (for example) to the auxiliary operator network (e.g., ON=O1), to the subscription operator network, or to a third party or any other operator network.

As previously mentioned, the radio network controller $26_{O1}$ of the auxiliary (first) operator's network has network protection filter 100. As illustrated in FIG. 5A and various subsequent drawings, network protection filter 100 includes a table 110 or other stored indication or list which is consulted to determine (on the basis of the obtained PLMN code) whether an action to be taken with respect to the target cell of the auxiliary (first) operator's network is permitted.

The table 110 is also hereinafter known as the PLMN/area table 110. As will be apparent from subsequent description, under certain circumstances involved in the solution scenarios the network protection filter 100 of radio network controller $26_{O1}$ of the auxiliary (first) operator's network is provided with the IMSI of the connected mode user equipment unit (UE) involved in a potential or attempted activity (e.g., handover, moveover, cell update), as well as an identification of the target cell. As understood by those skilled in the art, the IMSI is the international mobile subscriber identity, which is a unique identity allocated to each subscriber which facilitates correct subscriber identification over the radio path and through the network. The IMSI is usually a concatenation of mobile country code (MCC), mobile network code (MNC), and mobile station identification number (MSI).

In the above regard, in various embodiments of the invention the network protection filter 100 obtains a PLMN code from the IMSI (e.g., a combination of the mobile country code [MCC] and the mobile network code [MNC]). The network protection filter 100 then consults the PLMN/area table 110 to determine whether the sought or attempted activity is to be permitted by the auxiliary (first) operator's network. For example, the network protection filter 100 uses the PLMN code as an index for accessing the PLMN/area table 110, and determines from the table 110 for which areas (e.g., cells) controlled by radio network controller $26_{O1}$ of the auxiliary (first) operator's network the sought or attempted activity is permissible. The network protection filter 100 then searches the list of areas obtained from the table to determine whether the target cell is listed or encompassed within the areas on the list. For example, in the illustration of FIG. 5A, the PLMN/area table 110 includes a list of permitted areas for which an activity with respect to a user equipment unit (UE) of the subscription (second) operator's network is permitted.

Variations of the PLMN/area table 110 are, of course, possible. For example, the PLMN/area table 110 may list forbidden areas rather than permitted areas. In either case, the eligibility status of a cell can easily be obtained or inferred.

The "areas" which are the subject of the table 110 (which may be either permitted or forbidden) can be any conventional geographic or network-based unit, such as cells or location areas (LAs). As those skilled in the art appreciate, a cell is a basic unit of a cellular system and is the geographic area where coverage is provided by one base station. Location areas (LAs) are groups of cells, each location area having a separate Location Area Identity (LAI). Base stations within a location area periodically broadcast the LAI for the particular location area in which they are situated. In the event that the table 110 of network protection filter 100 is structured in terms of location area (LA), an optional subsidiary table 112 or the like may be utilized to look up a location area which includes the target cell (since it is the target cell which is communicated to the radio network controller $26_{O1}$ of the auxiliary (first) operator's network). At least in some embodiments herein described, all cells within a location area (LA) should uniformly be forbidden or uniformly accessible.

Rejecting Handover

The first solution component is that a UE in cell_DCH state cannot be handed over to a cell of the competing network in the competition area. In essence, the radio network controller $26_{O1}$ of the auxiliary (first) operator's network, which is the RNC which controls the target cell for the handover, is made in charge of deciding which UEs are allowed to access cells under its control. This provides the auxiliary (first) operator with consistent control over the resources used in the auxiliary (first) operator's network.

FIG. 5A particularly illustrates certain basic events, actions, or steps which occur for one mode of the first solution scenario, e.g., a situation in which the subscription operator network attempts to perform a handover to a target cell of the auxiliary operator network with respect to the user equipment unit (UE) which subscribes to the subscription operator network. The handover can be a soft handover, e.g., a handover in which the SRNC attempts to add a leg of the existing connection in the target cell.

As shown by event 5A-1 in FIG. 5A, radio network controller $26_{O1}$ of the auxiliary (first) operator's network obtains, from the initiating operator network, the international mobile subscriber identity (IMSI) of the user equipment unit (UE) and an identification of the target cell sought by the handover. In a 3GPP implementation of this scenario, and assuming that the user equipment unit (UE) is in a cell_DCH state, the international mobile subscriber identity (IMSI) of the user equipment unit (UE) and the identification of the target cell are particularly obtained from a RL SETUP REQUEST message issued by radio network controller $26_{ON}$ of the initiating operator's network.

As event 5A-2, the protecting control node uses the IMSI to determine whether the target cell is a restricted cell (e.g., whether this user equipment unit (UE) is allowed access to the target cell). Usage of the IMSI for the determination is in the manner above described with reference to example PLMN/area table 110 (e.g., obtaining a PLMN code from the IMSI of the user equipment unit [UE], and consulting table 110 to determine [on the basis of the obtained PLMN code] whether the target cell is eligible for handover for the user equipment unit [UE]. If the access is not allowed, the radio network controller $26_{O1}$ of the auxiliary (first) operator's network rejects the handover attempt (e.g., the RL SETUP REQUEST). As event 5A-3, the radio network controller $26_{O1}$ of the auxiliary (first) operator's network sends a message to radio network controller $26_{ON}$ of the initiating operator's network, indicating that the target cell is not accessible for this subscriber (e.g., user equipment unit [UE]).

Figure 5B:
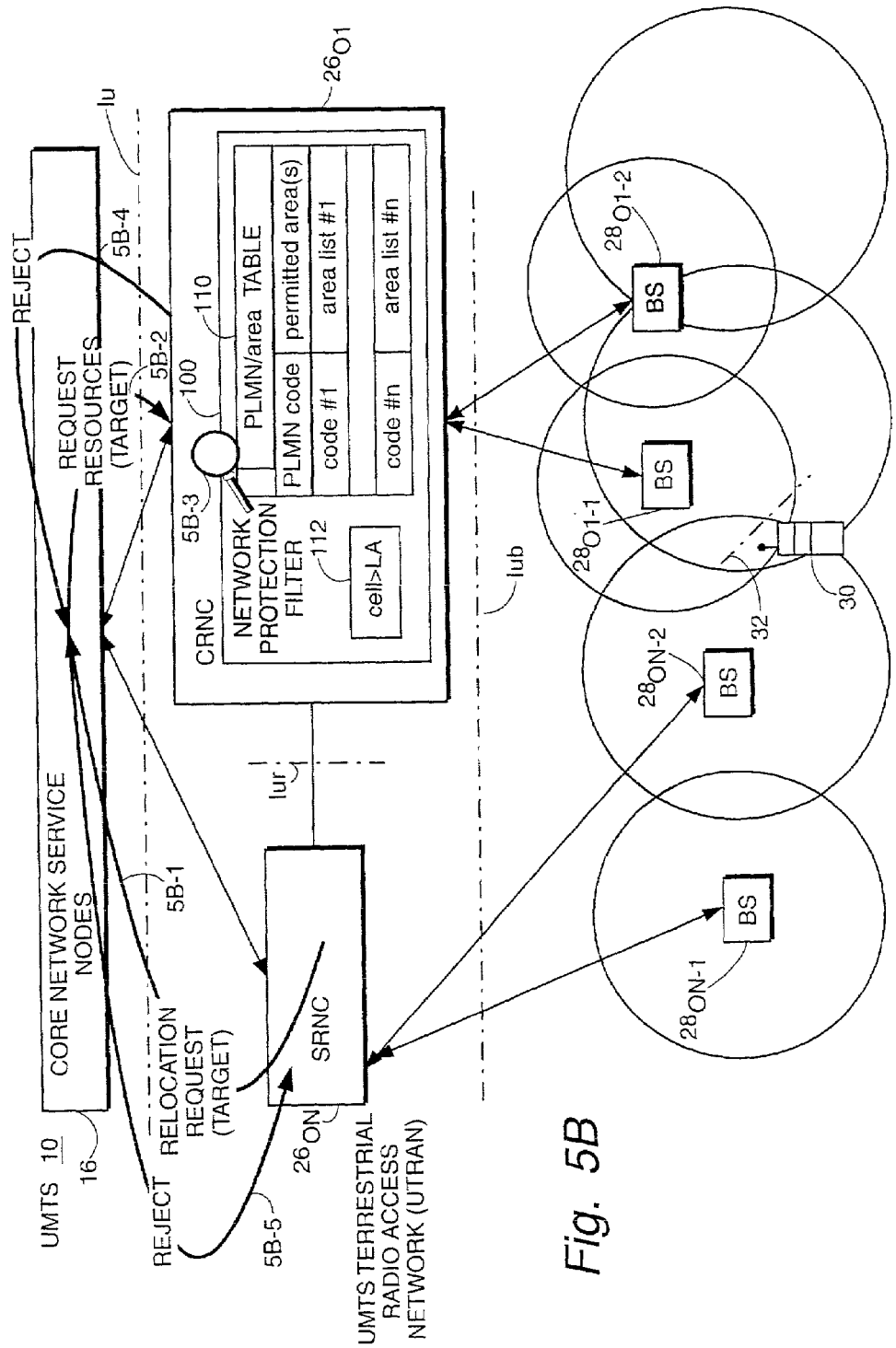

FIG. 5B likewise illustrates certain basic events, actions, or steps which occur for another mode of the first solution scenario, e.g., a situation in which the subscription operator network attempts to perform a type of handover known as a handover with SRNS relocation is attempted. In the context of the present invention, such a moveover is a transfer of a SRNC role from radio network controller $26_{ON}$ of the initiating operator's network to radio network controller $26_{O1}$ of the auxiliary (first) operator's network.

In the FIG. 5B scenario, as event 5B-1 radio network controller $26_{ON}$ of the initiating operator's network initiates the SRNS relocation procedure by sending a relocation request message to core network(s) 16, the relocation request message including an identification of the target cell. Then, in response, as event 5B-2, the core network(s) 16 requests resources for the relocation in the target RNC (i.e., in radio network controller $26_{O1}$ of the auxiliary (first)

operator's network). The request resources message of event 5B-2 includes the IMSI of the user equipment unit (UE) as well as the identification of the target cell.

In similar manner as in FIG. 5A, as event 5B-3 the target RNC (i.e., radio network controller $26_{O1}$ of the auxiliary (first) operator's network) uses PLMN/area table 110 to determine whether this subscriber is allowed to access the target cell, and thus whether the relocation can be successful. In the event that the relocation is not allowed, the target radio network controller $26_{O1}$ of the auxiliary (first) operator's network rejects the attempted relocation, issuing as event 5B-4 a message that the target cell is not accessible for this subscriber/user equipment unit (UE). In response, as event 5B-5 the core network(s) 16 subsequently send a reject message to radio network controller $26_{ON}$ of the initiating operator's network, such reject message also including a cause value or the like which explains that the target cell is not accessible for this subscriber/user equipment unit (UE).

In one example implementation of FIG. 5B, the message of event 5B-1 is a RELOCATION REQUIRED message, while the message of event 5B-2 is a RELOCATION REQUEST message.

Rejecting Cell Update

A second solution component is that the auxiliary (first) operator's network is able to reject accesses (cell updates and URA updates) from a UE in the competition area if the user equipment unit (UE) belongs to the subscription (second) operator's network. Cell updates can occur when the user equipment unit (UE) is in the cell_FACH or cell_PCH state; URA updates can occur when the user equipment unit (UE) is in the URA_CH state. As used herein, "update" encompasses both cell update and URA update.

This second solution component incorporates similar principles as for the cell_CH state (see the first solution, REJECTING HANDOVER, above), but applies when the connected mode user equipment unit (UE) is in the cell-_FACH state, the cell_PCH state, or the URA_PCH state rather than in the cell_DCH state. For this second solution component, the same PLMN/area table 110 configured in network protection filter 100 of radio network controller $26_{O1}$ of the auxiliary (first) operator's network is utilized.

By way of background, when a user equipment unit (UE) is using the RACH/FACH common channels (e.g., UE RRC state is cell_FACH), the first message sent from the user equipment unit (UE) upon entering a new cell is a CELL-UPDATE RRC message. The CELL-UPDATE RRC message serves as a kind of registration message to let the UTRAN know the new position of the user equipment unit (UE). The UTRAN then decides how to handle this user equipment unit (UE). If UTRAN decides that the user equipment unit (UE) is to remain on common channels, the user equipment unit (UE) will be told to remain on common channels. The user equipment unit (UE) then monitors the FACH for any downlink transmission, and uses a certain RACH for uplink access. This case of the user equipment unit (UE) using common channels thus differs from a case of a user equipment unit (UE) using dedicated channels, since usage of dedicated channels may set up a soft handover situation in which new radio links or connection legs with the user equipment unit (UE) are established via the new cell. In analogous manner, URA updating can occur when the user equipment unit (UE) is in the URA_PCH state. As mentioned above, generic reference herein to "update" encompasses both/either a cell update scenario and URA update scenario, the signaling sequence being essentially the same for both.

Various modes of the second solution component are illustrated in FIG. 6A(1), FIG. 6A(2), FIG. 6B(1), and FIG. 6B(2). This second solution component is generally applicable in a situation such as the following: The user equipment unit (UE) (which belongs to subscription (second) operator's network) has not yet learned that a certain area (e.g., cell or location area [LA]) is forbidden, and accordingly the user equipment unit (UE) attempts to perform an update (e.g., an update to a target cell of a LA). Event 6-1 of FIG. 6A(1), FIG. 6A(2), FIG. 6B(1), and FIG. 6B(2) shows the user equipment unit (UE) attempting an update toward radio network controller $26_{O1}$ of the auxiliary (first) operator's network. The update message of event 6-1 does not include the IMSI of the subscriber (e.g., of the user equipment unit [UE]), so as event 6-2 the radio network controller $26_{O1}$ of the auxiliary (first) operator's network can only include and forward the cell update message to radio network controller $26_{ON}$ of the initiating operator's network as in normal operation.

Upon receiving the update request of event 6-2, the radio network controller $26_{ON}$ of the initiating operator's network has two possible basic responses. A first possible response is to use Iur connection; a second possible response is to initiate an SRNS relocation. The communication of rejection to the user equipment unit (UE) can, in both possible responses, be implemented in either of two alternatives. For both possible basic responses, the first alternative involves sending a special rejection message to the user equipment unit (UE). The second alternative involves using another message which eventually has the effect of rejecting the cell update (e.g., a RRC RELEASE message sent from the SRNC to the user equipment unit (UE), which causes the user equipment unit (UE) to attempt an unsuccessful location registration to the core network(s) 16 and to realize that the cell is forbidden).

The first alternative of the first possible response is illustrated in FIG. 6A(1), while the second alternative of the first possible response is illustrated in FIG. 6A(2). The first alternative of the second possible response is illustrated in FIG. 6B(1), while the second alternative of the second possible response is illustrated in FIG. 6B(2).

FIG. 6A(1) illustrates the mode of the second solution component wherein the SRNC (i.e., radio network controller $26_{ON}$ of the initiating operator's network) remains in the old network and the Iur connection is utilized. As event 6A-3, the radio network controller $26_{ON}$ of the initiating operator's network sends a resource request message to radio network controller $26_{O1}$ of the auxiliary (first) operator's network, the message of event 6A-3 including the target cell, as well as the IMSI of the subscriber. In an illustrated 3GPP-based example implementation, the message of event 6A-3 can be a COMMON TRANSPORT CHANNEL RESOURCES REQUEST message issued to the CRNC. (e.g., radio network controller $26_{O1}$ of the auxiliary (first) operator's network).

As in previously described modes, as event 6A-4 the network protection filter 100 of radio network controller $26_{O1}$ of the auxiliary (first) operator's network uses PLMN/area table 110 to determine whether the user equipment unit (UE) is allowed access to the target cell. Should the user equipment unit (UE) not be allowed access, as event 6A-5 the radio network controller $26_{O1}$ of the auxiliary (first) operator's network sends a reject message radio network controller $26_{ON}$ of the initiating operator's network, advising that this cell is not accessible by the user equipment unit (UE). Then, as event 6A(1)-6, the radio network controller $26_{ON}$ of the initiating operator's network sends a reject message to user equipment unit (UE).

In the first alternative of FIG. 6A(1), the reject message of event 6A(1)-6 is a message which specifically rejects the update (e.g., a message dedicated to the purpose of rejecting the update or specifically carrying a direct code, field, or value which is understood as a rejection). The message of event 6A(1)-6 specifically indicates that the cell/URA for which the update is requested belongs to a forbidden area (e.g., a forbidden location area or forbidden cell). In response, as event 6A(1)-7, the user equipment unit (UE) stores the cell which drew the rejection message on its forbidden area list 202 (see FIG. 3). The user equipment unit (UE) then tries to select another cell, and eventually will select a cell of the initiating operator's network or else enter its idle mode.

FIG. 6A(2) illustrates the second alternative of implementing the Iur connection-utilizing mode of rejecting the update. For the FIG. 6A(2) scenario, events 6-1 and 6-2, as well as events 6A-3 through 6A-5 are essentially the same as shown in FIG. 6A(1). However, the second alternative of FIG. 6A(2) differs in its manner of communicating the rejection of the update to user equipment unit (UE). Specifically, this second alternative of FIG. 6A(2) can occur when a new message for rejecting a update is not available or otherwise feasible in the auxiliary (first) operator's network. In the second alternative of FIG. 6A(2), the rejection message of event 6A(2)-6 is a RRC RELEASE message. Upon receipt of the RRC RELEASE message of event 6A(2)-6, the user equipment unit (UE) enters the idle mode and attempts (as event 6A(2)-7) a location registration to the core network(s) 16. This location registration goes through radio network controller $26_{O1}$ of the auxiliary (first) operator's network (in the case of a cell update, for example), since the user equipment unit (UE) still believes that the target cell is a valid cell. The user equipment unit (UE) will only trigger this location registration if the LAI of the new cell is different from before (which explains why the forbidden or restricted areas are preferably location areas [LAs]).

The core network(s) 16, having the same information as in PLMN/area table 110, will reject the attempted location registration of event 6A(2)-7, as indicated by the rejection message of event 6A(2)-8. The message of event 6A(2)-8 indicates that the cause of the rejection is a forbidden area (e.g., forbidden location area [LA]). Although not shown as such in FIG. 6A(2) for sake of simplification of the drawing, the location registration of event 6A(2)-7 and the rejection of event 6A(2)-8 are made via base station that serves the cell involved in the update was sought. Upon receipt of such rejection, as event 6A(2)-9 the user equipment unit (UE) updates its list of forbidden areas 202 (see FIG. 3). Eventually the user equipment unit (UE) will select another area (e.g., hopefully of the subscription operator's network) and perform a successful registration.

FIG. 6B(1) illustrates the mode of the second solution component wherein the SRNC (i.e., radio network controller $26_{ON}$ of the initiating operator's network) decides to use a handover with SRNC relocation. FIG. 6B(1) shows that the events 6-1 through 6-2 of FIG. 6 have occurred in like manner as in FIG. 6A(1), with the result that radio network controller $26_{O1}$ of the auxiliary (first) operator's network has sent to radio network controller $26_{ON}$ of the initiating operator's network the update message 6-2. Then, as event 6B-3 radio network controller $26_{ON}$ of the subscription (second) operator's network initiates the handover with SRNS relocation procedure by sending a relocation request message to core network(s) 16. The relocation request message includes an identification of the target cell. Then, in response, as event 6B-4, the core network(s) 16 request resources for the relocation in the target RNC (i.e., in radio network controller $26_{O1}$ of the auxiliary (first) operator's network). The request resources message of event 6B-4 includes the IMSI of the user equipment unit (UE) as well as the identification of the target cell/URA.

In similar manner with previous scenarios, as event 6B-5 the target RNC (i.e., radio network controller $26_{O1}$ of the auxiliary (first) operator's network) uses PLMN/area table 110 to determine whether this subscriber is allowed to access the target cell/URA, and thus whether the moveover can be successful. In the event that the relocation is not allowed, the target radio network controller $26_{O1}$ of the auxiliary (first) operator's network rejects the attempted relocation, issuing as event 6B-6 a message that the target cell is not accessible for this subscriber/user equipment unit (UE). In response, as event 6B-7 the core network(s) 16 subsequently send a reject message to radio network controller $26_{ON}$ of the initiating operator's network, such reject message also including a cause value or the like which explains that the target cell is not accessible for this subscriber/user equipment unit (UE).

As in the first mode of the solution of rejecting updates, in the second mode the communication to user equipment unit (UE) of the rejection of the update can occur in either of two alternatives. The first alternative is illustrated in FIG. 6B(1), and is analogous to the Iur connection-utilizing communication of FIG. 6A(1). In this first alternative as event 6B(1)-8, the radio network controller $26_{ON}$ of the initiating operator's network sends a reject message to user equipment unit (UE). The reject message of event 6B(1)-8 is a message which specifically rejects the update (e.g., a message dedicated to the purpose of rejecting the update or specifically carrying a direct code, field, or value which is understood as a rejection). The message of event 6B(1)-8 specifically indicates that the cell for which the update is requested belongs to a forbidden area (e.g., a forbidden location area or forbidden cell). In response, as event 6B(1)-9, the user equipment unit (UE) stores the cell which drew the rejection message on its forbidden area list 202 (see FIG. 3). The user equipment unit (UE) then tries to select another cell, and eventually will select another cell (e.g., a cell of the subscription operator's network or else enter its idle mode).

The second alternative of the second mode of rejecting updates is illustrated in FIG. 6B(2). For the FIG. 6B(2) scenario, events 6-1 and 6-2, as well as events 6B-3 through 6B-7 are essentially the same as shown in FIG. 6B(1). However, like FIG. 6A(2), the second alternative of FIG. 6B(2) differs in its manner of communicating the rejection of the update to user equipment unit (UE). Specifically, this second alternative of FIG. 6B(2) can occur when a new message for rejecting an update is not available or otherwise feasible in the auxiliary (first) operator's network. In the second alternative of FIG. 6B(2), the rejection message of event 6B(2)-8 is a RRC RELEASE message. Upon receipt of the RRC RELEASE message of event 6B(2)-8, the user equipment unit (UE) enters the idle mode and attempts (as event 6B(2)-9) a location registration to the core network(s) 16.

The core network(s) 16, having the same information as in PLMN/area table 110, will reject the attempted location registration of event 6B(2)-9, as indicated by the rejection message of event 6B(2)-10. The message of event 6B(2)-10 indicates that the cause of the rejection is a forbidden area (e.g., forbidden location area [LA]). Although not shown as such in FIG. 6B(2) for sake of simplification of the drawing, the location registration of event 6B(2)-9 and the rejection of event 6B(2)-10 are made via base station that serves the cell for which the update was sought. Upon receipt of such rejection, as event 6B(2)-11 the user equipment unit (UE) updates its list of forbidden areas 202 (see FIG. 3). Eventually the user equipment unit (UE) will select another area (e.g., hopefully an area of the subscription operator's network) and perform a successful registration.

In example implementations of FIG. 6B(1) and FIG. 6B(2), the message of event 5B-1 is a RELOCATION REQUIRED message, while the message of event 5B-2 is a RELOCATION REQUEST message.

Avoiding UE Access to Forbidden Cells

The third solution component is that a user equipment unit (UE) in cell_FACH or cell_PCH state having functions which avoid selecting cells of the competitors network in the competition area, even though this network is considered "equivalent" from cell selection point of view. This third solution component thus concerns a situation in which the user equipment unit (UE) subscribes to its native operator network (e.g., the subscription (second) operator's network) and is in a connected mode, but attempts cell reselection to a target cell which is a restricted cell.

As shown in FIG. 3, in accordance with the present invention, the user equipment unit (UE) has a network access filter function 200 which checks whether the target cell is a restricted cell. In an example implementation, the mobile terminal maintains a list of restricted areas (e.g., forbidden area list 202) which is consulted as part of the checking. The network access filter function 200 may be implemented using individual hardware circuits, using software functioning in conjunction with a suitably programmed digital microprocessor or general purpose computer, using an application specific integrated circuit (ASIC), and/or using one or more digital signal processors (DSPs).

Thus, in this third solution component, the network access filter function 200 of the user equipment unit (UE) checks that the target cell is not part of an area (e.g, a location area [LA]) in the forbidden area list 202. In this checking, the UE does not indicate to higher layers mobility management any change of area (e.g., LA). The checking of the area (e.g., LA) in connected mode is only to determine if it is allowed to access the cell.

In one implementation of the invention, the same list of forbidden areas that is used for idle mode can be used for the connected mode.

The list of restricted areas 202 can be updated upon location registration to a core network, as in the manner indicated in FIG. 5A(2) and FIG. 6A(2). Alternatively, the list of restricted areas 202 can be updated upon receiving a rejection of an attempted cell update [e.g., in the manner indicated in FIG. 5A(1) and FIG. 6A(1)].

Figure 8:
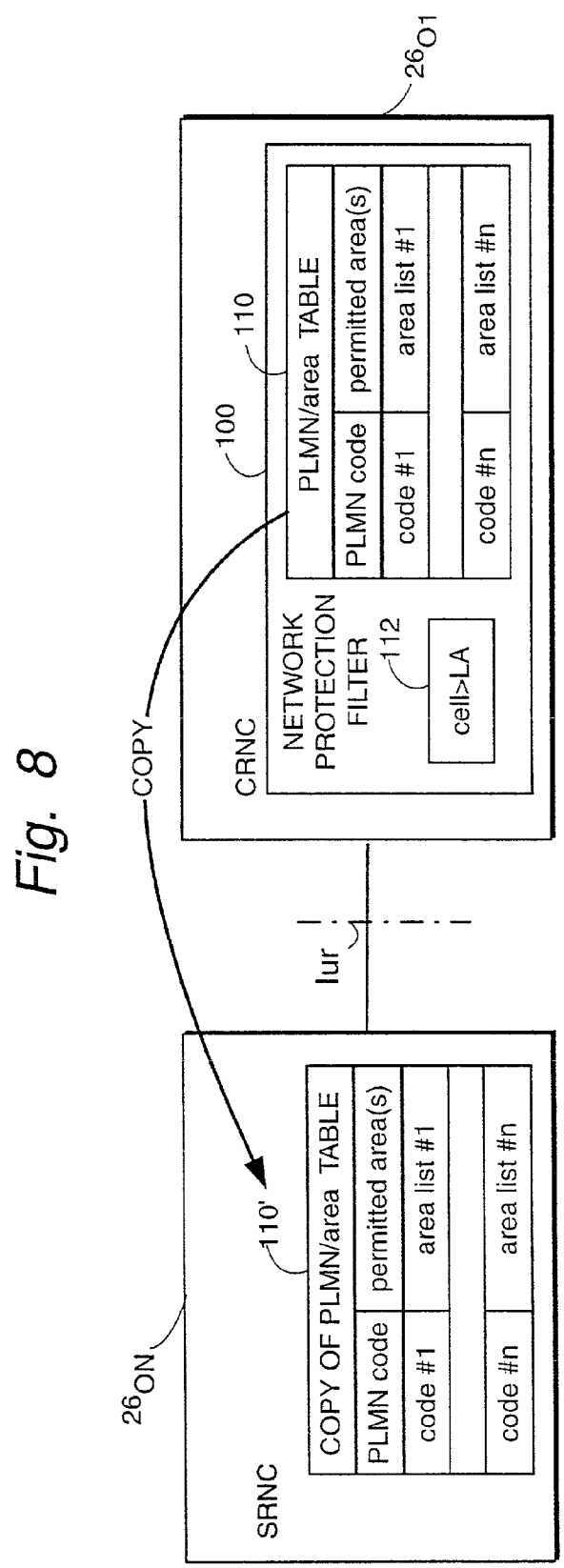
FIG. 8 is a diagrammatic view showing storage of a copy of a CRNC's PLMN/area table at a SRNC node.

FIG. 8 shows that the source radio network controller (RNC) SRNC of the initiating operator network may optionally store a copy 110' of the PLMN/area table 110 of the target RNC of the auxiliary operator network. With the table copy 110', the source RNC of the initiating operator network can predict whether an access will be rejected or not. If, with the aid of the table copy 110', the source RNC of the initiating operator network predicts a rejection of an access, unnecessary signaling between the source SRNC and target RNC may be avoided.

The present invention thus advantageously allows two operators, each having its own PLMN, to cooperate on coverage in some parts of the license area, whereas they can compete in other parts. In particular, the invention provides mechanisms to avoid and reject access of user equipment units (UEs) to cells to which the UE is not authorized to use resources.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. For use in a radio access network of a first operator network having cells which are eligible for utilization by a user equipment unit (UE) which is in a connected mode and which subscribes to a second operator network, a method comprising:

designating as a restricted cell any cell of the first operator network for which the second operator network has a competing cell;

rejecting attempted utilization by the user equipment unit (UE) which subscribes to the second operator network of the restricted cell;

wherein, with respect to the user equipment unit (UE) which subscribes to the second operator network, the step of rejecting comprises rejecting one of (1) handover to the restricted cell, and (2) cell/URA updating by the user equipment unit (UE) via the restricted cell.

2. The method of claim 1, wherein the user equipment unit (UE) is in one of a $cell_{13}$ DCH state, a $cell_{13}$ FACH state, a $cell_{13}$ PCH state, and a $URA_{13}$ PCH state.

3. The method of claim 1, wherein when the second operator network attempts to perform a handover to a target cell of the first operator network with respect to the user equipment unit (UE) which subscribes to the second operator network, the method further comprises:

obtaining an international mobile subscriber identity (IMSI) of the user equipment unit (UE) and an identification of the target cell;

using the IMSI to determine at the first operator network whether the target cell is a restricted cell; and if so;

rejecting the handover.

4. The method of claim 3, further comprising:

obtaining the international mobile subscriber identity (IMSI) of the user equipment unit (UE) and the identification of the target cell from a source radio network controller (SRNC) of an initiating operator network;

determining at a controlling radio network controller (CRNC) of the first operator network whether the target cell is a restricted cell.

5. The method of claim 4, wherein the user equipment unit (UE) is in a $cell_{13}$ DCH state, further comprising obtaining the international mobile subscriber identity (IMSI) of the user equipment unit (UE) and the identification of the target cell from a RL SETUP REQUEST message issued by the source radio network controller (SRNC) of the initiating operator network.

6. The method of claim 4, wherein the step of determining at the controlling radio network controller (CRNC) of the first operator network whether the target cell is a restricted cell comprises:

obtaining a operator network code from the IMSI of the user equipment unit (UE);

consulting a table maintained by the controlling radio network controller (CRNC) to determine whether the target cell is eligible for handover for the user equipment unit (UE) on the basis of the obtained PLMN code.

7. The method of claim 1, wherein when an initiating operator network attempts to perform moveover of a SRNC role to a radio network controller (RNC) of the first operator network, the method further comprises:
obtaining, from a core network, an international mobile subscriber identity (IMSI) of the user equipment unit (UE) and an identification of the target cell;
determining at the first operator network whether the target cell is a restricted cell; and if so;
notifying the core network that the moveover is rejected.

8. The method of claim 7, further comprising obtaining the international mobile subscriber identity (IMSI) of the user equipment unit (UE) and the identification of the target cell in a RELOCATION REQUEST message from the core network.

9. The method of claim 7, further comprising determining at a controlling radio network controller (CRNC) of the first operator network whether the target cell is a restricted cell.

10. The method of claim 9, wherein the step of determining at the controlling radio network controller (CRNC) of the first operator network whether the target cell is a restricted cell comprises:
obtaining a PLMN code from the IMSI of the user equipment unit (UE);
consulting a table maintained by the controlling radio network controller (CRNC) to determine whether the target cell is eligible for handover for the user equipment unit (UE) on the basis of the obtained PLMN code.

11. The method of claim 7, wherein the user equipment unit (UE) is in one of a $cell_{13}$ DCH state a $cell_{13}$ FACH state, a $cell_{13}$ PCH state, and a $URA_{13}$ PCH state.

12. The method of claim 1, wherein when the user equipment unit (UE) attempts to perform a cell/URA update relative to a target cell of the first operator network, the method further comprises:
obtaining an international mobile subscriber identity (IMSI) of the user equipment unit (UE) and an identification of the target cell;
determining at the first operator network whether the target cell is a restricted cell; and if so;
rejecting the update is rejected.

13. The method of claim 12, further comprising:
obtaining the international mobile subscriber identity (IMSI of the user equipment unit (UE) and the identification of the target cell from a source radio network controller (SRNC) of an initiating operator network;
determining at a controlling radio network controller (CRNC) of the first operator network whether the target cell is a restricted cell.

14. The method of claim 13, wherein the user equipment unit (UE) is in one of a $cell_{13}$ FACH state and a $cell_{13}$ PCH state, and further comprising obtaining the international mobile subscriber identity (IMSI) of the user equipment unit (UE) and the identification of the target cell from a COMMON TRANSPORT CHANNEL RESOURCES REQUEST message issued by the source radio network controller (SRNC) of the initiating operator network.

15. The method of claim 13, wherein the step of determining at the controlling radio network controller (CRNC) of the first operator network whether the target cell is a restricted cell comprises:

obtaining a PLMN code from the IMSI of the user equipment unit (UE);
consulting a table maintained by the controlling radio network controller (CRNC) to determine whether the target cell is eligible for handover for the user equipment unit (UE) on the basis of the obtained PLMN code.

16. The method of claim 13, further comprising generating a message which rejects the cell update and advises that the cell is restricted.

17. The method of claim 1, wherein the attempted utilization by the user equipment unit (UE) which subscribes to the second operator network of the restricted cell is an attempted cell reselection by the user equipment unit (UE), and further comprising transmitting an identification of the restricted cell from the first operator network to the user equipment unit (UE).

18. The method of claim 17, further comprising transmitting the identification of the restricted cell from the first operator network to the user equipment unit (UE) upon an attempted location registration by the user equipment unit (UE).

19. The method of claim 17, further comprising transmitting the identification of the restricted cell from the first operator network to the user equipment unit (UE) when transmitting a message to the user equipment unit (UE) which rejects an attempted cell update by the user equipment unit (UE).

20. A radio access network of a first operator network having cells which are eligible for utilization by a user equipment unit (UE) which is in a connected mode and which subscribes to a second operator network; the network comprising:
means for designating as a restricted cell any cell of the first operator network for which the second operator network has a competing cell;
means for rejecting attempted utilization by the user equipment unit (UE) which subscribes to the second operator network of the restricted cell;
wherein with respect to the user equipment unit (UE) which subscribes to the second operator network, the means for rejecting rejects one of (1) handover to the restricted cell, and (2) cell/URA updating by the user equipment unit (UE) via the restricted cell.

21. The apparatus of claim 20, wherein the user equipment unit (UE) is in one of a $cell_{13}$ DCH state, a $cell_{13}$ FACH state, a $cell_{13}$ PCH state, and a $URA_{13}$ PCH state.

22. The apparatus of claim 20, wherein an initiating operator network attempts to perform a handover to a target cell of the first operator network with respect to the user equipment unit (UE) which subscribes to the second operator network, the apparatus further comprises:
means for obtaining, from the initiating operator network, an international mobile subscriber identity (IMSI) of the user equipment unit (UE) and an identification of the target cell;
means for using the IMSI to determine at the first operator network whether the target cell is a restricted cell; and if so;
means for rejecting the handover.

23. The apparatus of claim 22, wherein the means for obtaining obtains the international mobile subscriber identity (IMSI) of the user equipment unit (UE) and the identification of the target cell from a source radio network controller (SRNC) of the initiating operator network, and wherein the means for using the IMSI to determine whether the target cell is a restricted cell is situated at a controlling radio network controller (CRNC) of the first operator network.

24. The apparatus of claim 23, wherein the user equipment unit (UE) is in a $cell_{13}$ DCH state, and wherein the means for obtaining obtains the international mobile subscriber identity (IMSI) of the user equipment unit (UE) and the identification of the target cell from a RL SETUP REQUEST message issued by the source radio network controller (SRNC) of the initiating operator network.

25. The apparatus of claim 23, wherein the means for using the IMSI to determine whether the target cell is a restricted cell comprises:
    means for obtaining a PLMN code from the IMSI of the user equipment unit (UE);
    a table maintained by the controlling radio network controller (CRNC) which is consulted to determine whether the target cell is eligible for handover for the user equipment unit (UE) on the basis of the obtained PLMN code.

26. The apparatus of claim 20, wherein an initiating operator network attempts to perform relocation of a SRNC role to a radio network controller (RNC) of the first operator network, and wherein the apparatus further comprises:
    means for obtaining, from a core network, an international mobile subscriber identity (IMSI) of the user equipment unit (UE) and an identification of the target cell;
    means for determining at the first operator network whether the target cell is a restricted cell; and if so;
    means for notifying the core network that the relocation is rejected.

27. The apparatus of claim 26, wherein the means for obtaining obtains the international mobile subscriber identity (IMSI) of the user equipment unit (UE) and the identification of the target cell in a RELOCATION REQUEST message from the core network.

28. The apparatus of claim 26, wherein the means for determining is situated at a controlling radio network controller (CRNC) of the first operator network.

29. The apparatus of claim 28, wherein the means for determining whether the target cell is a restricted cell comprises:
    means for obtaining a PLMN code from the IMSI of the user equipment unit (UE);
    a table maintained by the controlling radio network controller (CRNC) which is consulted to determine whether the target cell is eligible for handover for the user equipment unit (UE) on the basis of the obtained PLMN code.

30. The apparatus of claim 26, wherein the user equipment unit (UE) is in one of a $cell_{13}$ DCH state, a $cell_{13}$ FACH state, a cell_PCH state, and a URA_PCH state.

31. The apparatus of claim 20, wherein the user equipment unit (UE) attempts to perform a cell/URA update with respect to a target cell of the first operator network, and wherein the apparatus further comprises:
    means for obtaining, from an initiating operator network, an international mobile subscriber identity (IMSI) of the user equipment unit (UE) and an identification of the target cell;
    means for determining at the first operator network whether the target cell is a restricted cell; and if so;
    means for providing a notification that the update is rejected.

32. The apparatus of claim 31, wherein the means for obtaining obtains the international mobile subscriber identity (IMSI) of the user equipment unit (UE) and the identification of the target cell from a source radio network controller (SRNC) of the second operator network; and wherein the means for determining is situated at a controlling radio network controller (CRNC) of the first operator network.

33. The apparatus of claim 32, wherein the user equipment unit (UE) is in one of a $cell_{13}$ FACH state and a $cell_{13}$ PCH state, and wherein the means for obtaining obtains the international mobile subscriber identity (IMSI) of the user equipment unit (UE) and the identification of the target cell from a COMMON TRANSPORT CHANNEL RESOURCES REQUEST message issued by the source radio network controller (SRNC) of the second operator network.

34. The apparatus of claim 32, wherein the means for determining whether the target cell is a restricted cell comprises:
    means for obtaining a PLMN code from the IMSI of the user equipment unit (UE);
    a table maintained by the controlling radio network controller (CRNC) which is consulted to determine whether the target cell is eligible for handover for the user equipment unit (UE) on the basis of the obtained PLMN code.

35. The apparatus of claim 32, further comprising means for generating a message which rejects the update and advises that the target cell is restricted.

36. The apparatus of claim 20, wherein the attempted utilization by the user equipment unit (UE) which subscribes to the second operator network of the restricted cell is an attempted cell reselection by the user equipment unit (UE), and further comprising means for transmitting an identification of the restricted cell from the first operator network to the user equipment unit (UE).

37. The apparatus of claim 36, wherein the means for transmitting the identification of the restricted cell from the first operator network to the user equipment unit (UE) transmits upon an attempted location registration by the user equipment unit (UE).

38. The apparatus of claim 36, wherein the means for transmitting the identification of the restricted cell from the first operator network to the user equipment unit (UE) transmits the identification of the restricted cell when transmitting a message to the user equipment unit (UE) which rejects an attempted cell update by the user equipment unit (UE).

39. A radio access network of a first operator network, the network comprising:
    at least one base station having a radio frequency signal monitored by a user equipment unit (UE), the user equipment unit (UE) being in a connected mode and subscribing to a second operator network;
    a control node which controls the at least one base station;
    a PLMN filter which rejects attempted utilization, by the user equipment unit (UE) which subscribes to the second operator network, of a restricted cell of the first operator network, the restricted cell being a cell of the first operator network for which the second operator network has a competing cell;
    wherein with respect to the user equipment unit (UE) which subscribes to the second operator network, the PLMN filter rejects one of (1) handover to the restricted cell, and (2) cell/URA updating by the user equipment unit (UE) via the restricted cell.

40. The apparatus of claim 39, wherein PLMN filter operates when the user equipment unit (UE) is in one of a $cell_{13}$ DCH state, a $cell_{13}$ FACH state, a $cell_{13}$ PCH state, and a $URA_{13}$ PCH state.

41. The apparatus of claim 39, wherein when an initiating operator network attempts to perform a handover to a target cell of the first operator network with respect to the user equipment unit (UE) which subscribes to the second operator network, the PLMN filter:
- obtains, from the initiating operator network, an international mobile subscriber identity (IMSI) of the user equipment unit (UE) and an identification of the target cell;
- uses the IMSI to determine at the first operator network whether the target cell is a restricted cell; and if so;
- notifies the initiating operator network that the handover is rejected.

42. The apparatus of claim 41, wherein the PLMN filter obtains the international mobile subscriber identity (IMSI) of the user equipment unit (UE) and the identification of the target cell from a source radio network controller (SRNC) of the initiating operator network, and wherein the PLMN filter uses the IMSI to determine whether the target cell is a restricted cell is situated at a controlling radio network controller (CRNC) of the first operator network.

43. The apparatus of claim 42, wherein the user equipment unit (UE) is in a $cell_{13}$ DCH state, and wherein the PLMN filter obtains the international mobile subscriber identity (IMSI) of the user equipment unit (UE) and the identification of the target cell from a RL SETUP REQUEST message issued by the source radio network controller (SRNC) of the initiating operator network.

44. The apparatus of claim 42, wherein the PLMN filter obtains a PLMN code from the IMSI of the user equipment unit (UE); and wherein the PLMN filter comprises a table which is consulted to determine whether the target cell is eligible for handover for the user equipment unit (UE) on the basis of the obtained PLMN code.

45. The apparatus of claim 39, wherein when the initiating operator network attempts to perform moveover of a SRNC role to a radio network controller (RNC) of the first operator network, the PLMN filter:
- obtains, from a core network, an international mobile subscriber identity (IMSI) of the user equipment unit (UE) and an identification of the target cell;
- determines whether the target cell is a restricted cell; and if so;
- notifies the core network that the moveover is rejected.

46. The apparatus of claim 45, wherein the PLMN filter obtains the international mobile subscriber identity (IMSI) of the user equipment unit (UE) and the identification of the target cell in a RELOCATION REQUEST message from the core network.

47. The apparatus of claim 45, wherein the PLMN filter is situated at a controlling radio network controller (CRNC) of the first operator network.

48. The apparatus of claim 47, wherein the PLMN filter obtains a PLMN code from the IMSI of the user equipment unit (UE); and wherein the PLMN filter comprises a table which is consulted to determine whether the target cell is eligible for handover for the user equipment unit (UE) on the basis of the obtained PLMN code.

49. The apparatus of claim 45, wherein the user equipment unit (UE) is in one of a $cell_{13}$ DCH state, a $cell_{13}$ FACH state, a $cell_{13}$ PCH state, and a URA_PCH state.

50. The apparatus of claim 39, wherein when the user equipment unit (UE) attempts to perform a cell/URA update with respect to a target cell of the first operator network, the PLMN filter:
- obtains an international mobile subscriber identity (IMSI) of the user equipment unit (UE) and an identification of the target cell;
- determines whether the target cell is a restricted cell; and if so;
- provides a notification that the update is rejected.

51. The apparatus of claim 50, wherein the PLMN filter obtains the international mobile subscriber identity (IMSI) of the user equipment unit (UE) and the identification of the target cell from a source radio network controller (SRNC) of an initiating operator network; and wherein the PLMN filter is situated at a controlling radio network controller (CRNC) of the first operator network.

52. The apparatus of claim 51, wherein the user equipment unit (UE) is in one of a $cell_{13}$ FACH state and a $cell_{13}$ PCH state, and wherein the PLMN filter obtains the international mobile subscriber identity (IMSI) of the user equipment unit (UE) and the identification of the target cell from a COMMON TRANSPORT CHANNEL RESOURCES REQUEST message issued by the source radio network controller (SRNC) of the initiating operator network.

53. The apparatus of claim 51, wherein the PLMN filter obtains a PLMN code from the IMSI of the user equipment unit (UE); and wherein the PLMN filter comprises a table which is consulted to determine whether the target cell is eligible for handover for the user equipment unit (UE) on the basis of the obtained PLMN code.

54. The apparatus of claim 51, wherein the PLMN filter generates a message which rejects the update and advises that the target cell is restricted.

55. A control node of a radio access network of a first operator network which rejects attempted utilization, by a user equipment unit (UE) which subscribes to the second operator network, of a restricted cell of the first operator network, the restricted cell being a cell of the first operator network for which the second operator network has a competing cell;
- wherein with respect to the user equipment unit (UE) which subscribes to the initiating operator network, the control node rejects one of (1) handover to the restricted cell, and (2) cell/URA updating by the user equipment unit (UE) via the restricted cell.

56. The apparatus of claim 55, wherein the control node rejects the attempted utilization when the user equipment unit (UE) is in one of a $cell_{13}$ DCH state, a $cell_{13}$ FACH state, a $cell_{13}$ PCH state, and a $URA_{13}$ PCH state.

57. The apparatus of claim 55, wherein when an initiating operator network attempts to perform a handover to a target cell of the first operator network with respect to the user equipment unit (UE) which subscribes to the second operator network, the control node:
- obtains an international mobile subscriber identity (IMSI) of the user equipment unit (UE) and an identification of the target cell;
- uses the IMSI to determine at the first operator network whether the target cell is a restricted cell; and if so;
- notifies the initiating operator network that the handover is rejected.

58. The apparatus of claim 57, wherein the control node obtains the international mobile subscriber identity (IMSI) of the user equipment unit (UE) and the identification of the target cell from a source radio network controller (SRNC) of the initiating operator network, and wherein the control node uses the IMSI to determine whether the target cell is a restricted cell is situated at a controlling radio network controller (CRNC) of the first operator network.

59. The apparatus of claim 58, wherein the user equipment unit (UE) is in a $cell_{13}$ DCH state, and wherein the control node obtains the international mobile subscriber identity (IMSI) of the user equipment unit (UE) and the identification of the target cell from a RL SETUP REQUEST message issued by the source radio network controller (SRNC) of the initiating operator network.

60. The apparatus of claim 58, wherein the control node obtains a PLMN code from the IMSI of the user equipment unit (UE); and wherein the control node has a table which is consulted to determine whether the target cell is eligible for handover for the user equipment unit (UE) on the basis of the obtained PLMN code.

61. The apparatus of claim 55, wherein when an initiating operator network attempts to perform relocation of a SRNC role to a radio network controller (RNC) of the first operator network, the control node:
   obtains, from a core network, an international mobile subscriber identity (IMSI) of the user equipment unit (UE) and an identification of the target cell;
   determines whether the target cell is a restricted cell; and if so;
   notifies the core network that the relocation is rejected.

62. The apparatus of claim 61, wherein the control node obtains the international mobile subscriber identity (IMSI) of the user equipment unit (UE) and the identification of the target cell in a RELOCATION REQUEST message from the core network.

63. The apparatus of claim 61, wherein the control node is a controlling radio network controller (CRNC) of the first operator network.

64. The apparatus of claim 63, wherein the control node obtains a PLMN code from the IMSI of the user equipment unit (UE); and wherein the control node comprises a table which is consulted to determine whether the target cell is eligible for handover for the user equipment unit (UE) on the basis of the obtained PLMN code.

65. The apparatus of claim 61, wherein the user equipment unit (UE) is in one of a $cell_{13}$ DCH state, a $cell_{13}$ FACH state, a $cell_{13}$ PCH state, and a $URA_{13}$ PCH state.

66. The apparatus of claim 61, wherein when the user equipment unit (UE) attempts to perform a cell/URA update relative to a target cell of the first operator network, the control node:
   obtains an international mobile subscriber identity (IMSI) of the user equipment unit (UE) and an identification of the target cell;
   determines whether the target cell is a restricted cell; and if so;
   provides a notification that the update is rejected.

67. The apparatus of claim 66, wherein the control node obtains the international mobile subscriber identity (IMSI of the user equipment unit (UE) and the identification of the target cell from a source radio network controller (SRNC) of an initiating operator network; and wherein the control node is a controlling radio network controller (CRNC) of the first operator network.

68. The apparatus of claim 67, wherein the user equipment unit (UE) is in one of a $cell_{13}$ FACH state and a $cell_{13}$ PCH state, and wherein the control node obtains the international mobile subscriber identity (IMSI) of the user equipment unit (UE) and the identification of the target cell from a COMMON TRANSPORT CHANNEL RESOURCES REQUEST message issued by the source radio network controller (SRNC) of the initiating operator network.

69. The apparatus of claim 67, wherein the control node obtains a PLMN code from the IMSI of the user equipment unit (UE); and wherein the control node comprises a table which is consulted to determine whether the target cell is eligible for handover for the user equipment unit (UE) on the basis of the obtained PLMN code.

70. The apparatus of claim 67, wherein the control node generates a message which rejects the update and advises that the target cell is restricted.

* * * * *